United States Patent
Furuhashi et al.

(10) Patent No.: US 7,992,181 B2
(45) Date of Patent: Aug. 2, 2011

(54) INFORMATION PRESENTATION SYSTEM, INFORMATION PRESENTATION TERMINAL AND SERVER

(75) Inventors: Yukihito Furuhashi, Hachioji (JP); Takao Shibasaki, Tokyo (JP); Akito Saito, Hino (JP); Yuichiro Akatsuka, Tama (JP)

(73) Assignee: Olympus Corporation, Tokyo (JP)

( * ) Notice: Subject to any disclaimer, the term of this patent is extended or adjusted under 35 U.S.C. 154(b) by 818 days.

(21) Appl. No.: 12/043,674

(22) Filed: Mar. 6, 2008

(65) Prior Publication Data

US 2008/0166053 A1 Jul. 10, 2008

Related U.S. Application Data

(63) Continuation of application No. PCT/JP2006/306933, filed on Mar. 31, 2006.

(51) Int. Cl.
*H04N 7/173* (2011.01)
*H04N 5/76* (2006.01)
*G06K 9/46* (2006.01)
*G06K 9/00* (2006.01)
*G06K 9/62* (2006.01)
*G06K 9/68* (2006.01)

(52) U.S. Cl. ............ 725/105; 348/231.99; 382/190; 382/181; 382/224; 382/209; 382/219

(58) Field of Classification Search ............ 725/105; 348/231.99–231.9; 382/117, 118, 181, 191, 382/209, 217, 218, 220, 224
See application file for complete search history.

(56) References Cited

U.S. PATENT DOCUMENTS

| | | | | |
|---|---|---|---|---|
| 6,337,926 | B2 * | 1/2002 | Takahashi et al. | 382/216 |
| 7,136,529 | B2 * | 11/2006 | Furuhashi et al. | 382/209 |
| 2002/0136468 | A1 * | 9/2002 | Sun | 382/305 |
| 2004/0086203 | A1 * | 5/2004 | Furuhashi et al. | 382/305 |
| 2004/0264777 | A1 * | 12/2004 | Furuhashi et al. | 382/190 |
| 2006/0026148 | A1 | 2/2006 | Furuhashi et al. | |

FOREIGN PATENT DOCUMENTS

| | | |
|---|---|---|
| JP | 6-12494 | 1/1994 |
| JP | 9-152990 | 6/1997 |
| JP | 11-39332 | 2/1999 |

(Continued)

OTHER PUBLICATIONS

Chinese Office Action dated Jun. 1, 2010 with translation.

(Continued)

*Primary Examiner* — Lin Ye
*Assistant Examiner* — Marly Camargo
(74) *Attorney, Agent, or Firm* — Scully, Scott, Murphy & Presser, P.C.

(57) ABSTRACT

An information presentation system includes an imaging unit, a peripheral information acquisition unit which acquires peripheral information, a storage unit which stores registered information, an analytic basic information construction unit which constructs analytic basic information from the registered information stored in the storage unit, on the basis of the peripheral information acquired in the peripheral information acquisition unit, a pertinent information acquisition unit which acquires information pertinent to the image from the image obtained from the imaging unit and the analytic basic information obtained from the analytic basic information construction unit, and a presentation unit which presents the pertinent information acquired in the pertinent information acquisition unit. The analytic basic information construction unit changes the analytic basic information on the basis of at least one of a time, date, season, weather, temperature, humidity, place, surrounding brightness, average color/color distribution of the acquired image, surrounding sound and model.

16 Claims, 18 Drawing Sheets

FOREIGN PATENT DOCUMENTS

| | | |
|---|---|---|
| JP | 11-144054 | 5/1999 |
| JP | 2000-215313 | 8/2000 |
| JP | 2002-297610 | 10/2002 |
| JP | 2003-15980 | 1/2003 |
| JP | 2003-189223 | 7/2003 |
| JP | 2003-348327 | 12/2003 |
| JP | 2004-48674 | 2/2004 |
| JP | 2004-145555 | 5/2004 |
| JP | 2004-179783 | 6/2004 |
| JP | 2004-288170 | 10/2004 |
| JP | 2005-182350 | 7/2005 |
| JP | 2005182350 * | 7/2005 |
| JP | 2005-208761 | 8/2005 |
| JP | 2005-251054 | 9/2005 |

OTHER PUBLICATIONS

Japanese Office Action dated Jun. 22, 2010 with translation.

* cited by examiner

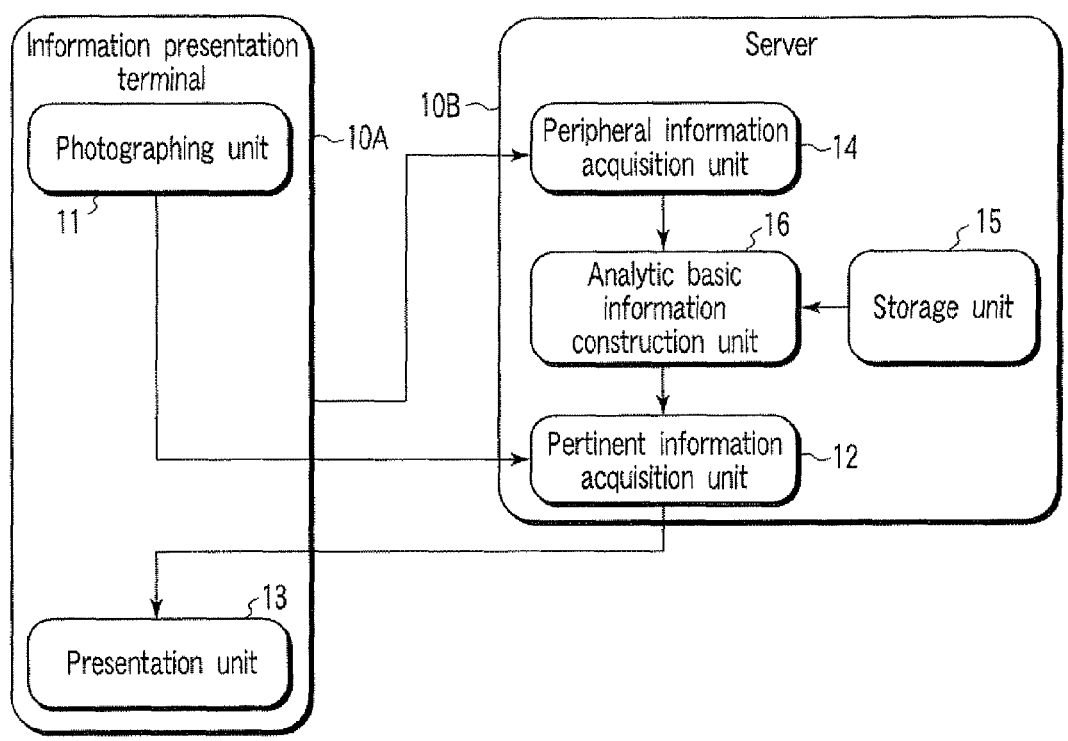
F I G. 7

41C

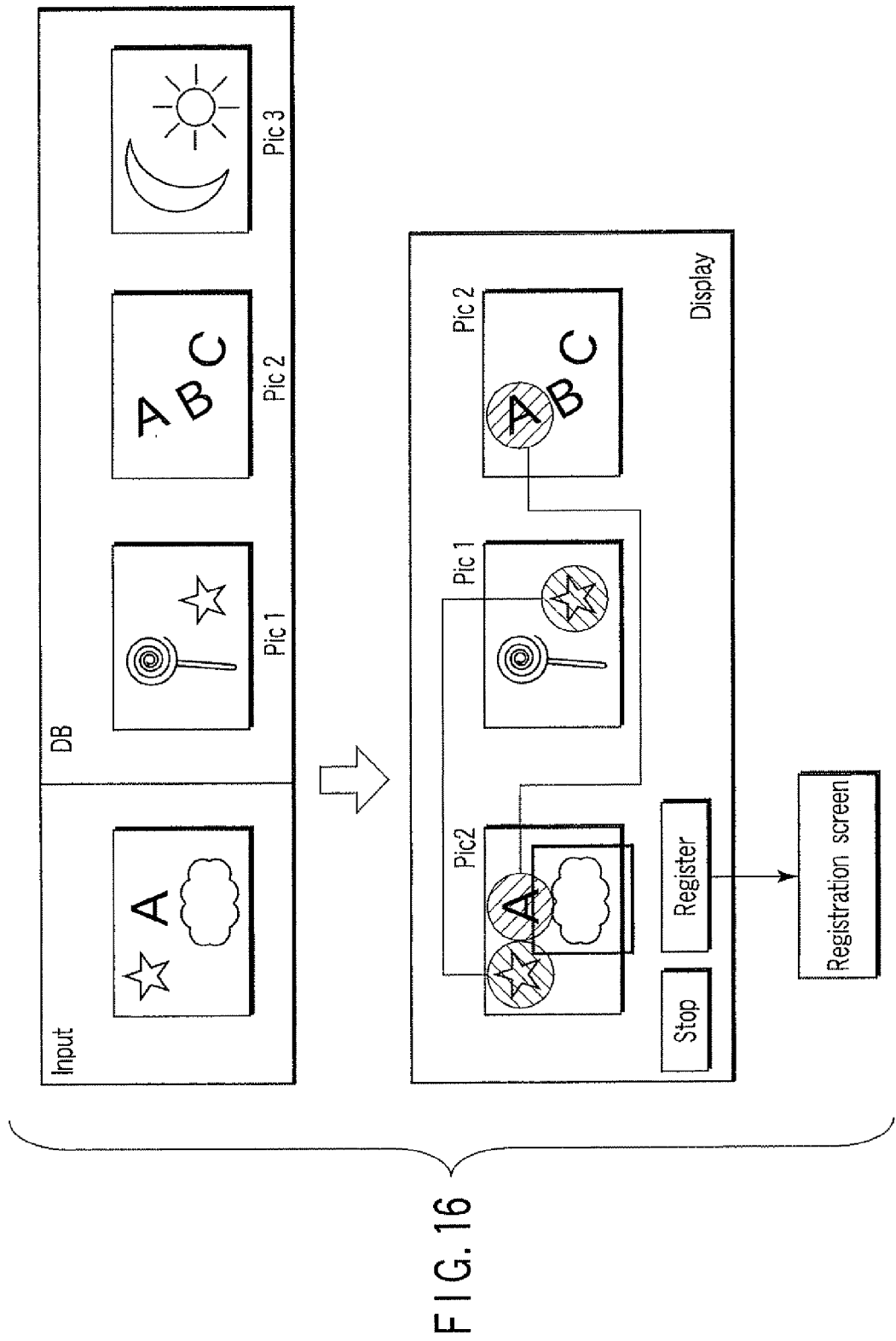
F I G. 16

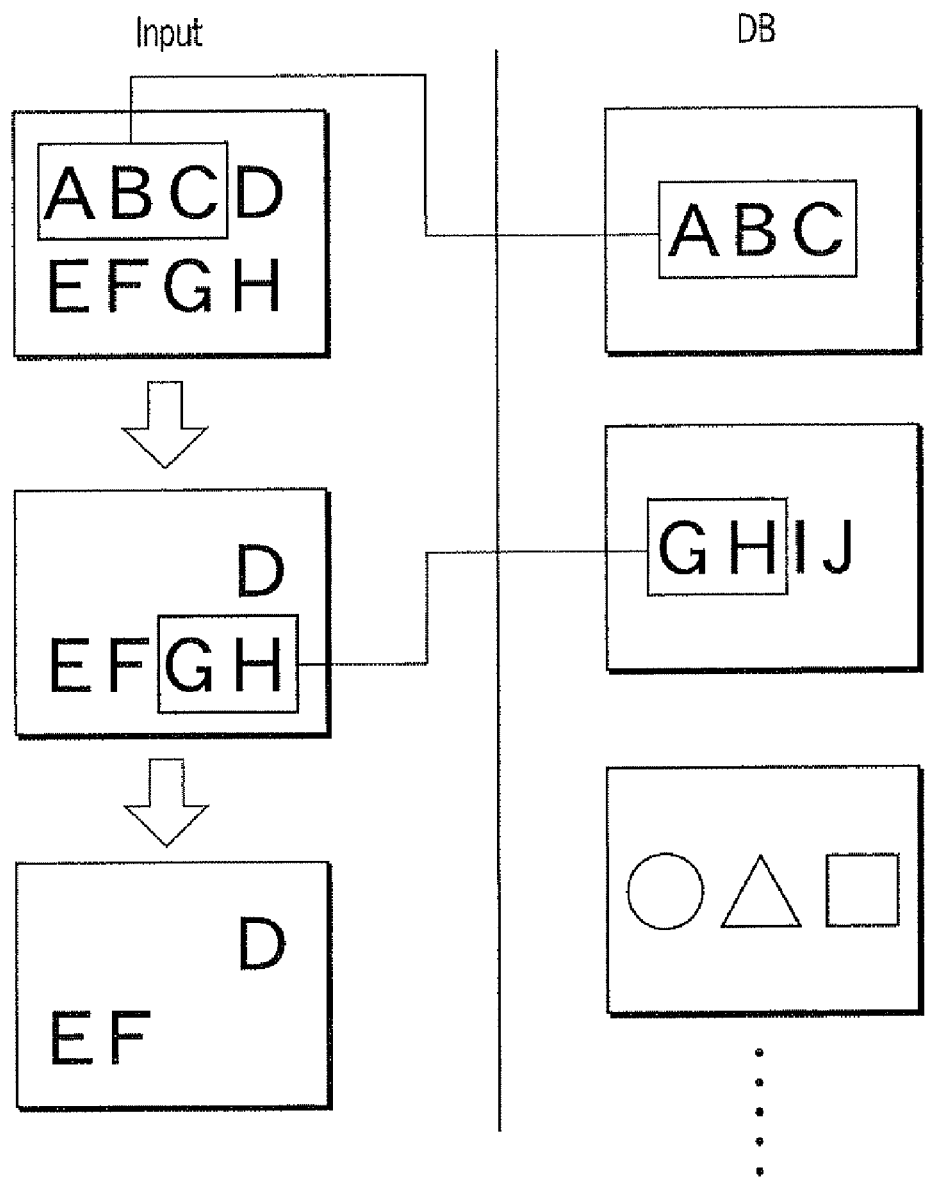
F I G. 19

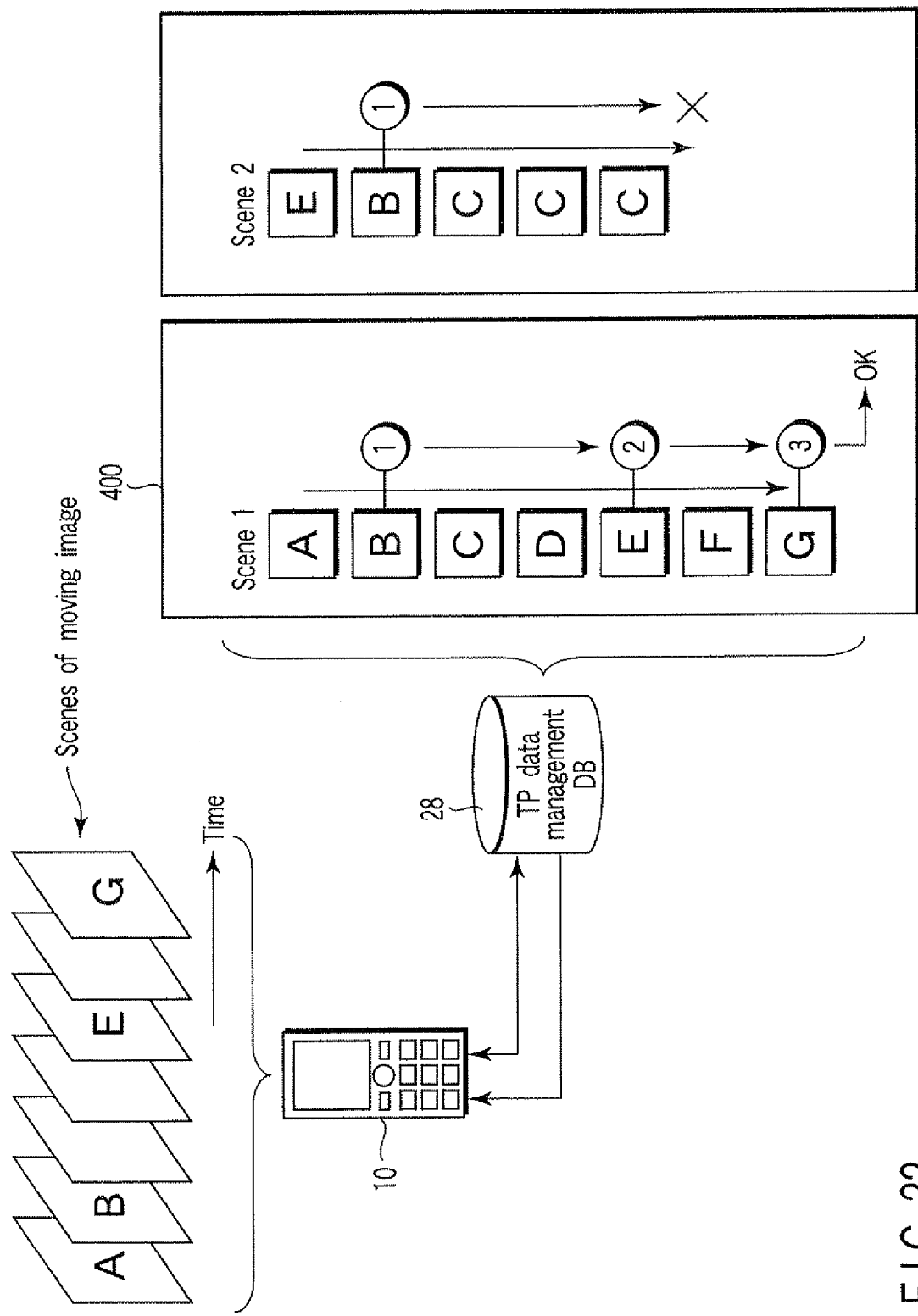
F I G. 22

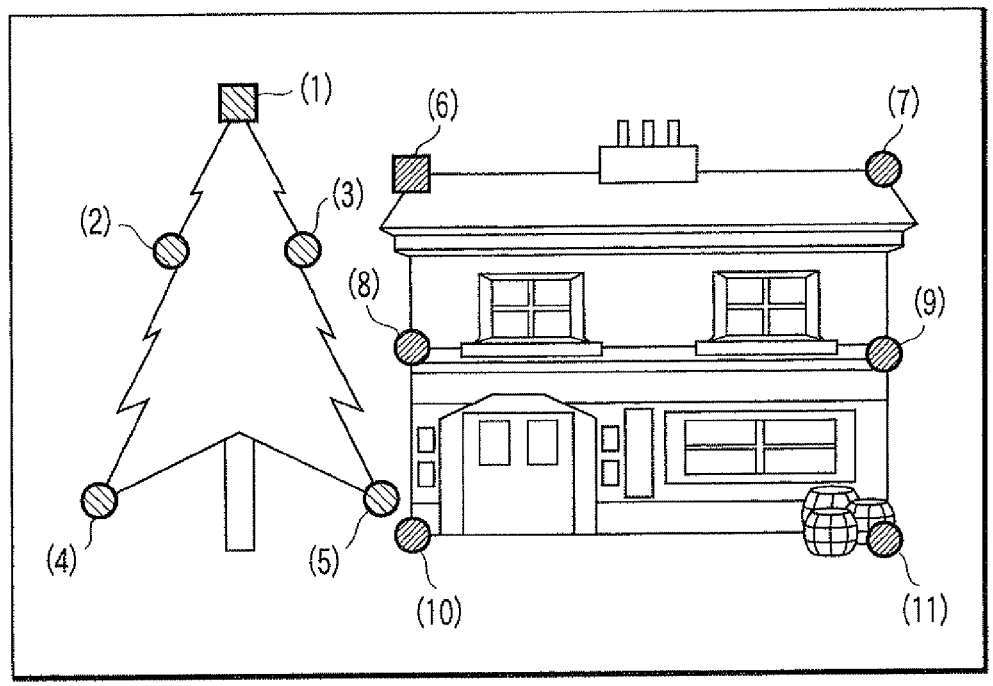
F I G. 24
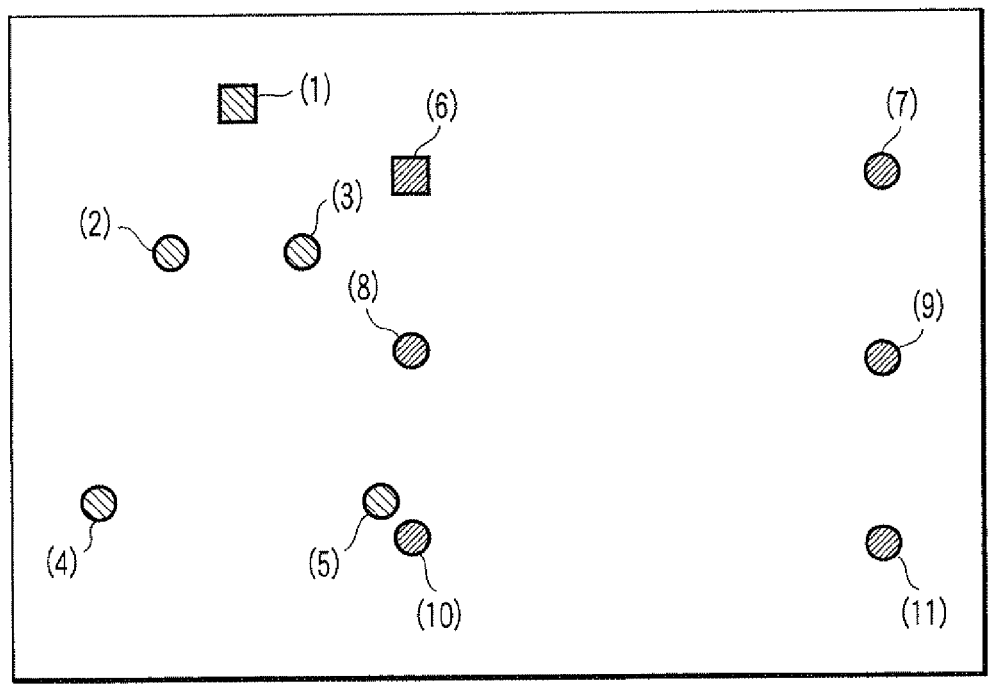
F I G. 25

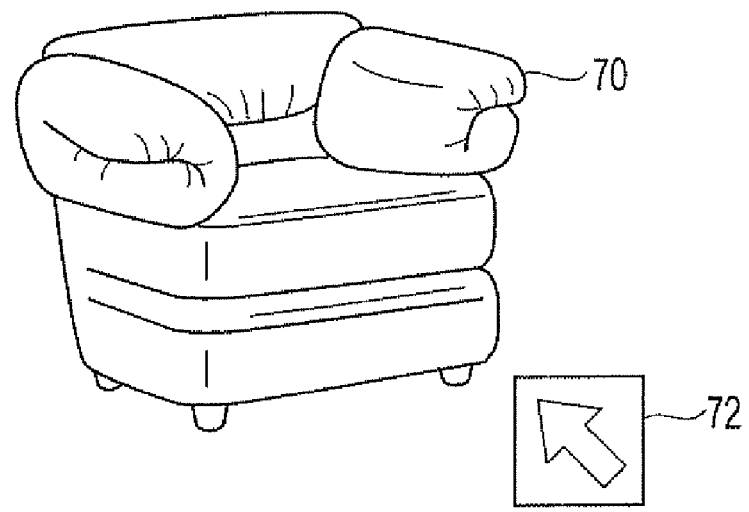
F I G. 28
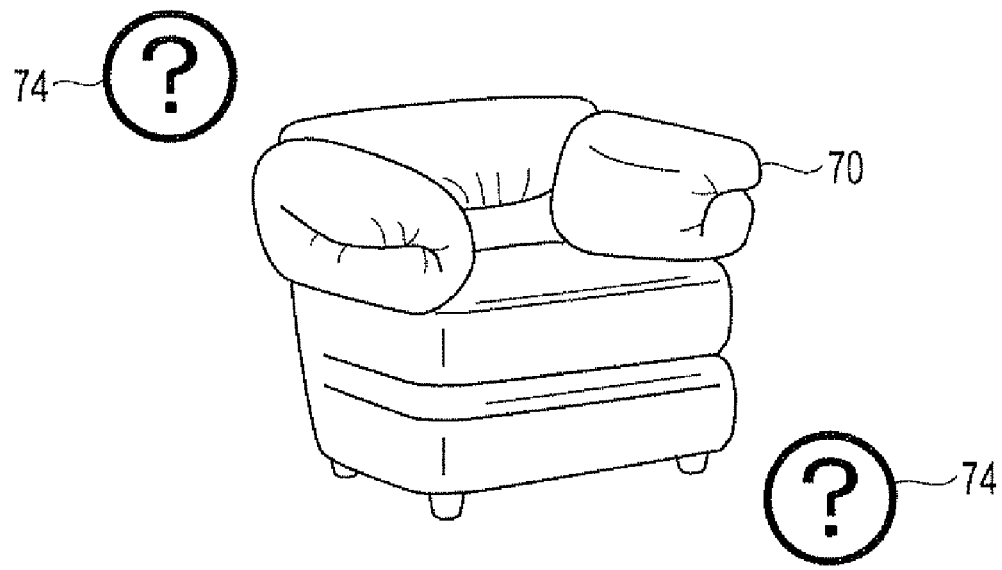
F I G. 29

US 7,992,181 B2

INFORMATION PRESENTATION SYSTEM, INFORMATION PRESENTATION TERMINAL AND SERVER

CROSS REFERENCE TO RELATED APPLICATIONS

This is a Continuation Application of PCT Application No. PCT/JP2006/306933, filed Mar. 31, 2006, which was published under PCT Article 21(2) in Japanese.

BACKGROUND OF THE INVENTION

1. Field of the Invention

The present invention relates to an information presentation system, an information presentation terminal and a server for presenting information pertinent to an image obtained from an imaging unit.

2. Description of the Related Art

There has been disclosed a technique in Jpn. Pat. Appln. KOKAI Publication No. 2003-15980, in which a server uses a taken image of a logo to find a corresponding URL. In other words, in this technique, a logo mark contained in an advertisement printed in, for example, a magazine is first photographed with a portable device. Then, the logo mark acquired by this photography is sent to a search server via the Internet. The search server searches for a logo mark closest to the logo mark sent via the Internet. The search server then sends a URL corresponding to the logo mark that has been searched for, to the portable device via the Internet. The portable device accesses the URL so that a homepage can be viewed.

There has been disclosed another technique, in Jpn. Pat. Appln. KOKAI Publication No. 2004-179783, in which an ID is read by a portable client device in such a manner that a user is unconscious of the kind of the ID. In other words, in this technique, the portable client device first acquires an image with a camera or scanner. The portable client device then extracts an ID from the image regardless of whether this image is a one-dimensional barcode, two-dimensional barcode, electronic-watermarked image or normal image. Further, the portable client device wirelessly transmits the ID to an external ID information database. The portable client device wirelessly receives information from the ID information database.

On the other hand, as a method of judging the degree of correspondence between two images, the following method has been disclosed by Yasushi Kanazawa and Kenichi Kanatani, in "Automatic search by correspondence of characteristic points between two images", IMAGE LAB, pp. 20-23, November 2004 (Japan Industrial Publishing). First, characteristic points as recognition elements in an input image and a comparative image are extracted. Then, the characteristic point in the input image is compared with the characteristic point in the comparative image. In this comparison between the characteristic points, a method such as RANSAC is used to judge whether the value of similarity between the images exceeds a threshold value set to a predetermined value as a satisfaction of data.

BRIEF SUMMARY OF THE INVENTION

One aspect of an information presentation system of the present invention comprises:

an imaging unit which obtains an image;

a peripheral information acquisition unit which acquires peripheral information;

a storage unit which stores registered information;

an analytic basic information construction unit which constructs analytic basic information from the registered information stored in the storage unit, on the basis of the peripheral information acquired in the peripheral information acquisition unit;

a pertinent information acquisition unit which acquires information pertinent to the image from the image obtained from the imaging unit and the analytic basic information obtained from the analytic basic information construction unit; and a presentation unit which presents the pertinent information acquired in the pertinent information acquisition unit, wherein the analytic basic information construction unit changes the analytic basic information on the basis of at least one of a time, date, season, weather, temperature, humidity, place, surrounding brightness, average color/color distribution of the acquired image, surrounding sound and model.

Furthermore, one aspect of an information presentation terminal of the present invention comprises:

an imaging unit which obtains an image;

a peripheral information acquisition unit which acquires peripheral information pertinent to the imaging unit;

an analytic basic information construction unit which constructs analytic basic information from registered information downloaded from a server via a communication line, on the basis of the peripheral information acquired in the peripheral information acquisition unit;

a pertinent information acquisition unit which acquires information pertinent to the image from the image obtained from the imaging unit and the analytic basic information obtained from the analytic basic information construction unit; and a presentation unit which presents the pertinent information acquired in the pertinent information acquisition unit, wherein the analytic basic information construction unit changes the analytic basic information on the basis of at least one of a time, date, season, weather, temperature, humidity, place, surrounding brightness, average color/color distribution of the acquired image, surrounding sound and model.

Furthermore, one aspect of a server of the present invention comprises:

a peripheral information acquisition unit which acquires an image obtained from an imaging unit and transmitted from an information presentation terminal via a communication line and/or peripheral information pertinent to the imaging unit;

a storage unit which stores registered information; and an analytic basic information construction unit which constructs analytic basic information from the registered information stored in the storage unit, on the basis of the peripheral information acquired in the peripheral information acquisition unit;

wherein the analytic basic information construction unit changes the analytic basic information on the basis of at least one of a time, date, season, weather, temperature, humidity, place, surrounding brightness, average color/color distribution of the acquired image, surrounding sound and model, and the analytic basic information constructed in the analytic basic information construction unit is downloaded by the information presentation terminal, such that the information presentation terminal acquires information pertinent to the image from the analytic basic information and from an image obtained from the imaging unit and, presents the information.

That is, in the information presentation system, information presentation terminal and server of the present invention, at least one of a time, date, season, weather, temperature, humidity, place, surrounding brightness, average color/color distribution of the acquired image, surrounding sound and model is used as the peripheral information. Thus, the analytic basic information is constructed from the registered information on the basis of the peripheral information. Then, the analytic basic information is added to the image taken in the imaging unit in order to acquire and present the information pertinent to the image.

The peripheral information acquisition unit which acquires peripheral information includes, for example, the following: When, for example, the time is employed as the peripheral information, the peripheral information acquisition unit includes a built-in clock or a communication unit for obtaining time information for a predetermined place via a communication line. When, for example, the date is employed as the peripheral information, the peripheral information acquisition unit includes built-in calendar information or a communication unit for obtaining a date in a predetermined place via a communication line. When, for example, the weather, temperature or humidity is employed as the peripheral information, the peripheral information acquisition unit includes a built-in temperature/humidity sensor and an electronic circuit for judging the weather in accordance with an output from this sensor, or a communication unit for obtaining temperature, humidity or weather information in a predetermined place via a communication line. When, for example, the surrounding brightness is employed as the peripheral information, the peripheral information acquisition unit includes a built-in illuminance sensor or an analyzing circuit for analyzing the image taken in the imaging unit to find the illuminance. When, for example, the average color/color distribution of the acquired image is employed as the peripheral information, the peripheral information acquisition unit includes an analyzing circuit for analyzing information on the image taken in the imaging unit. When, for example, the surrounding sound is employed as the peripheral information, the peripheral information acquisition unit includes a sound volume sensor. When, for example, the model is employed as the peripheral information, the peripheral information acquisition unit includes a built-in memory for recording model information.

Furthermore, the imaging unit includes, for example, an image pickup device such as a CCD or CMOS, and an optical system for forming an image on a light receiving surface of the image pickup device.

The storage unit includes, for example, a memory element or hard disk drive (HOD) which is built in or accessible via a communication line.

The analytic basic information construction unit includes, for example, a built-in CPU and an analytic basic information construction program which operates on the CPU.

Furthermore, the presentation unit includes, for example, a liquid crystal or plasma display. It also includes a speaker when necessary information is presented by sound.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a block configuration diagram of an information presentation system according to a fourth embodiment of the present invention;

FIG. 16 is a diagram showing one example of a display method which emphatically displays a part judged to be similar to the image registered in the TP data management DB in the case of divided registration;

FIG. 19 is a diagram showing a process of sequentially dividing and deleting similar parts of the object image and finally leaving dissimilar parts as initially registered parts when there are, in the TP data management DB, a plurality of images similar to the object image desired to be registered;

FIG. 22 is a diagram showing an example utilizing matching in the case of registering a moving image in the TP data management DB;

FIG. 24 is a diagram explaining an object recognizing method according to a twelfth embodiment;

FIG. 25 is a diagram explaining the object recognizing method according to the twelfth embodiment;

FIG. 28 is a diagram showing one example of the display form of a marker image in the fifteenth embodiment of the present invention; and FIG. 29 is a diagram showing one example of the display form of the marker image in the fifteenth embodiment of the present invention.

DETAILED DESCRIPTION OF THE INVENTION

A best mode for carrying out the present invention will hereinafter be described with reference to the drawings.

First Embodiment

Figure 1:
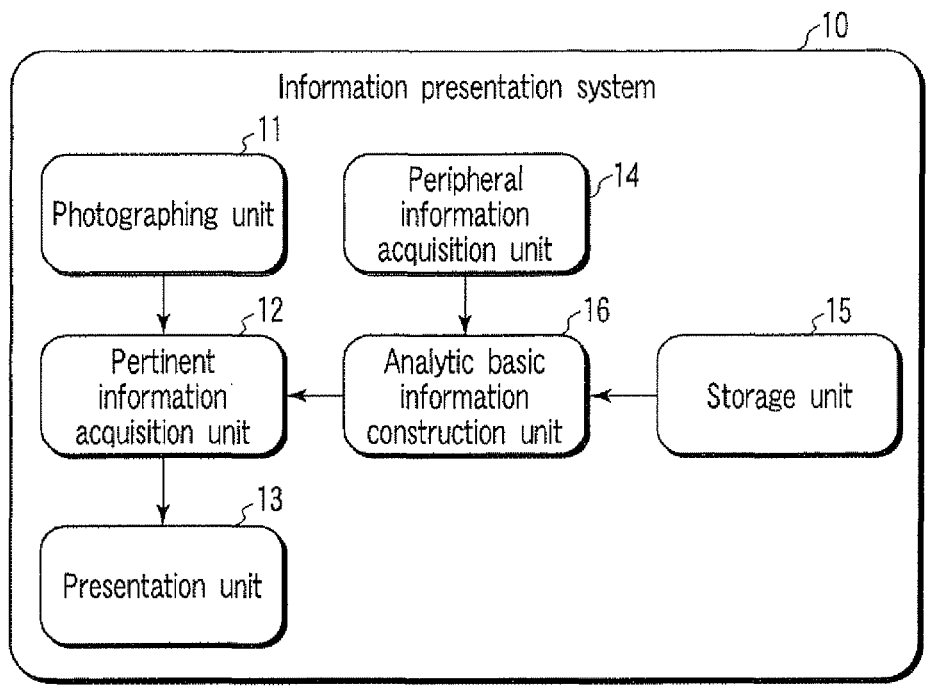
FIG. 1 is a block configuration diagram of an information presentation system according to a first embodiment of the present invention.
Figure 2:
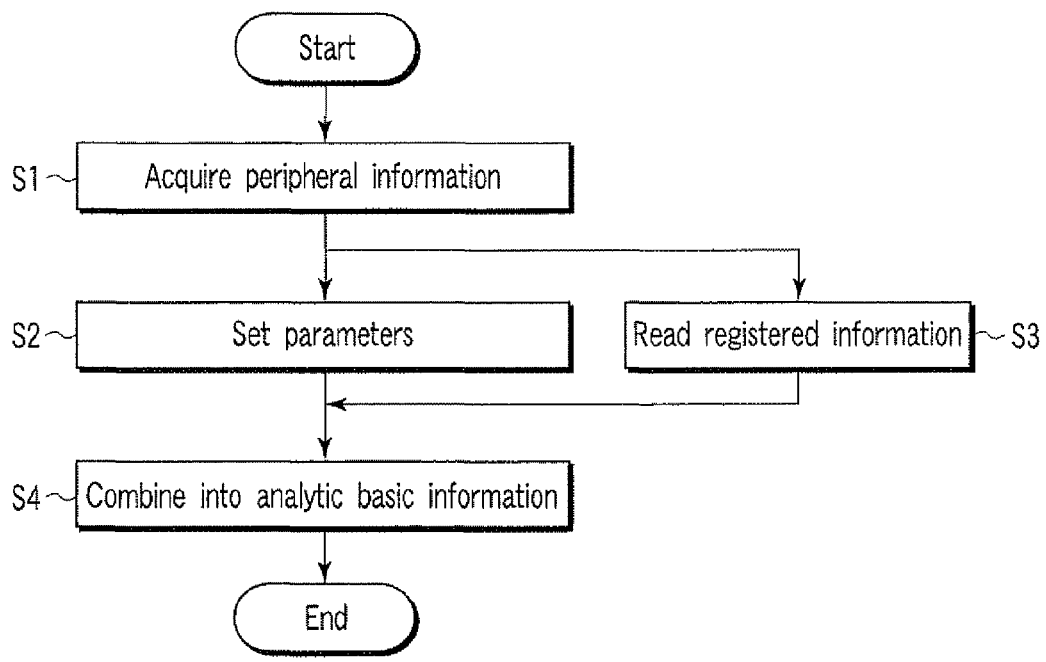
FIG. 2 is a diagram showing an operation flowchart for an analytic basic information construction unit.

As shown in FIG. 1, an information presentation system 10 according to a first embodiment of the present invention has a photographing unit 11, a pertinent information acquisition unit 12, a presentation unit 13, a peripheral information acquisition unit 14, a storage unit 15 and an analytic basic information construction unit 16. The photographing unit 11 is an imaging unit such as a camera. The pertinent information acquisition unit 12 acquires information pertinent to a predetermined image such as a marker image or logo image obtained from the photographing unit 11. The presentation unit 13 presents the pertinent information acquired in the pertinent information acquisition unit 12. The peripheral information acquisition unit 14 acquires peripheral information pertinent to the photographing unit 11. The storage unit 15 stores registered information. The analytic basic information construction unit 16 constructs analytic basic information from the registered information stored in the storage unit 15, on the basis of the peripheral information acquired in the peripheral information acquisition unit 14.

Here, the peripheral information acquired in the peripheral information acquisition unit 14 includes at least one of a time, date, season, weather, temperature, humidity, place, surrounding brightness, average color/color distribution of the acquired image, surrounding sound and model. The analytic basic information construction unit 16 changes the analytic basic information on the basis of the peripheral information. That is, the analytic basic information construction unit 16 acquires the peripheral information from the peripheral information acquisition unit 14 (step S1). The analytic basic information construction unit 16 further sets various parameters in accordance with the peripheral information (step S2). Simultaneously with step S2, the analytic basic information construction unit 16 selectively reads the registered information from the storage unit 15 (step S3). Then, the analytic basic information construction unit 16 combines the set parameters and the read registered information, as analytic basic information (step S4). The analytic basic information construction unit 16 provides the analytic basic information constructed in step S4 to the pertinent information acquisition unit 12. From the image obtained from the photographing unit 11 and from the analytic basic information provided from the analytic basic information construction unit 16, the pertinent information acquisition unit 12 acquires information pertinent to the image.

For example, the following can be conceived as a specific example of the information presentation system 10 having such a configuration.

On startup, the peripheral information acquisition unit 14 acquires date/time information, and the analytic basic information construction unit 16 acquires a telephone number corresponding to the time from an address book in the storage unit 15 to construct the analytic basic information as described above. The analytic basic information construction unit 16 can select the optimum information from the information prepared in advance in this manner. The analytic basic information also includes output information. That is, the analytic basic information construction unit 16 changes the output information on the basis of the peripheral information. Here, assume an application which, when, for example, an album with a photograph of a face is photographed by the photographing unit 11, recognizes the face and displays a telephone number. Assume in this case that the telephone number of an office is acquired and used as the analytic basic information between 9:00 and 18:00 on weekdays. However, acquiring a home telephone number and using it as the analytic basic information is conceivable on holidays or after 18:00 on weekdays. Moreover, after 22:00, the home telephone number is likewise acquired, but may be used as the analytic basic information with a message "emergency only" added thereto.

Alternatively, on startup, the peripheral information acquisition unit 14 may acquire position information, and the analytic basic information construction unit 16 may construct analytic basic information from the registered information (sign) located 1 km around the position indicated by the position information, among the registered information (signs) in the storage unit 15. In this case, if there is a GPS or communication device, the peripheral information acquisition unit 14 can determine the position information by, for example, radio field intensities of base stations, or position information such as latitude and longitude or an address embedded in a marker or two-dimensional code of an object to be photographed. With such a configuration, information corresponding to the relevant place can be presented even if the sign exists in a plurality of areas. For example, it is possible to provide an application which displays the nearest repair reception office if a logo mark of a company A is photographed by the photographing unit 11. It is also possible to provide an application which, if the sign of a convenience store B is photographed by the photographing unit 11, acquires current weather or weather forecast information in accordance with the position information in order to present sales promotion information for this convenience store, for example, "Umbrellas now XXX yen, still in stock". Thus, according to the information presentation system 10 of the present first embodiment, it is possible to present various kinds of information such as navigation or sales promotion information.

Alternatively, on startup, the peripheral information acquisition unit 14 can acquire the surrounding brightness or the brightness of the image acquired from the photographing unit 11, and on the basis of the acquired brightness information, the analytic basic information construction unit 16 can perform processing such as the adjustment of a threshold value for image processing or the adjustment of the parameter of a contrast filter. Thus, even if the image acquired in the photographing unit 11 is a dark image, the marker, face photograph or logo mark, for example, to be recognized can be recognized. For example, when photography has been carried out in a room with slightly low illumination, a threshold value for binarization is reduced by 10% in accordance with the brightness of the image. This adjustment enables stable extraction of the logo or photograph even if its surrounding is slightly dark. Moreover, stable recognition is enabled if the extracted logo or photograph as a recognition target is matched with a template likewise provided as analytic basic information.

Alternatively, on startup, the peripheral information acquisition unit 14 acquires surrounding brightness or the brightness of the image acquired from the photographing unit 11, and if it is dark, the analytic basic information construction unit 16 constructs analytic basic information from the registered information directed to an illuminated sign or luminous sign. This enables the recognition even of a sign which appears differently in darkness.

Moreover, information can be presented in an easily viewable manner because the colors of components in a screen can be adjusted to colors corresponding to the surrounding brightness.

Second Embodiment

Figure 3:
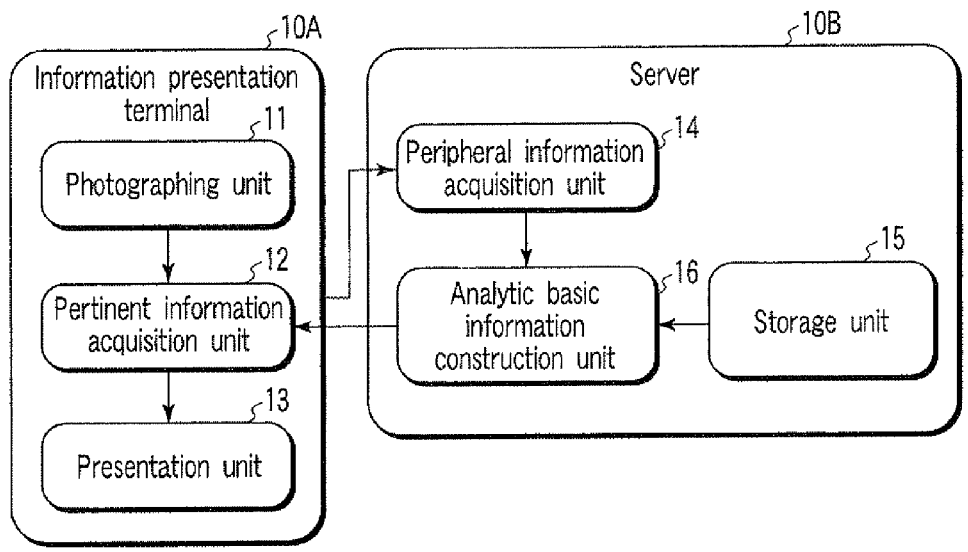
FIG. 3 is a block configuration diagram of an information presentation system according to a second embodiment of the present invention.

As shown in FIG. 3, an information presentation system according to a second embodiment of the present invention is divided into an information presentation terminal 10A and a server 10B. The information presentation terminal 10A is connected to the server 10B by a communication line. In this case, the information presentation terminal 10A includes the photographing unit 11, the pertinent information acquisition unit 12 and the presentation unit 13. The server 10B includes the peripheral information acquisition unit 14, the storage unit 15 and the analytic basic information construction unit 16.

Figure 4:
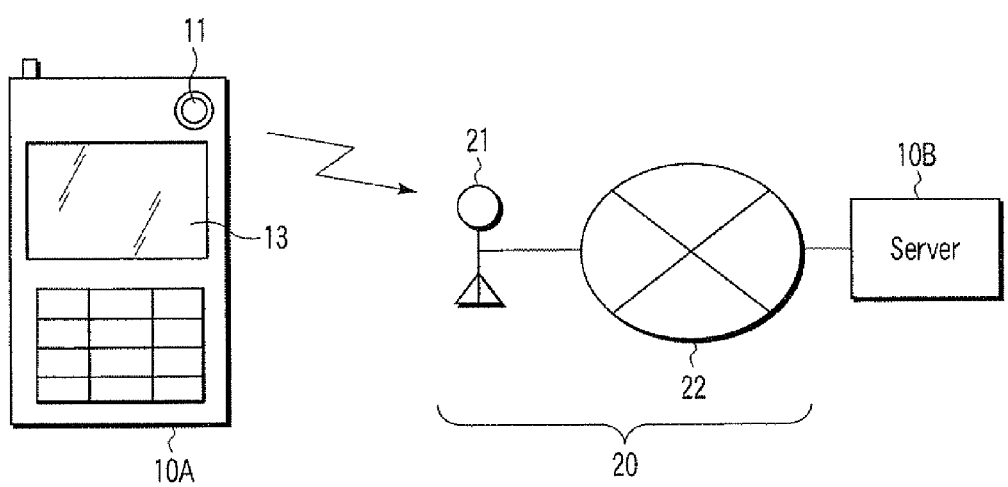
FIG. 4 is a diagram showing the configuration of the information presentation system when an information presentation terminal is configured as a mobile telephone.

In addition, when the information presentation terminal 10A is configured as a mobile telephone, the configuration of the information presentation system according to the present second embodiment is, for example, as shown in FIG. 4. Here, the peripheral information acquisition unit 14 of the server 10B not only acquires, as peripheral information, information from a sensor or GPS provided in the information presentation terminal 10A, but also acquires, for example, position information and environment information provided by a base station 21 as peripheral information.

Alternatively, when the information presentation terminal 10A is a portable information device such as a PDA equipped with an Internet connection function, a communication line 20 includes the Internet, In this case, the information presentation terminal 10A and the server 10B are not necessarily located in the same country. Therefore, the peripheral information acquisition unit 14 of the server 108 may acquire date information as peripheral information from a clock provided in the information presentation terminal 10A accordingly.

In such a configuration, the optimum analytic basic information is constructed in the analytic basic information construction unit 16 on the server 10B on the startup of the information presentation terminal 10A or in downloading analytic basic information from the server 10B.

For example, the threshold value for binarization (image processing) is adjusted on the server 10B in accordance with the model of the mobile telephone as the information presentation terminal 10A in order to construct analytic basic information. Moreover, an image processing filter is set in accordance with the model of the mobile telephone as the information presentation terminal 10A in order to construct analytic basic information. That is, there are a large number of models of mobile telephones, and the optical performance of the photographing unit 11 varies accordingly. Therefore, performing stable image recognition processing is difficult if suitable image processing parameters are not set. For example, an image blurs in some models of mobile telephones, so that setting a slightly high threshold value for binarization is effective. Moreover, in the models of mobile telephones in which an image blurs, setting an edge enhancement filter as an image processing filter is effective for stable image recognition.

Further alternatively, a template size may be adjusted in accordance with the model of the mobile telephone. The template size may also be adjusted in accordance with the number of registered pieces of information to be incorporated in the analytic basic information and/or the similarity of the registered information. For example, when the similarity of the registered information to be combined as the analytic basic information is equal to or higher than a preset value, a template size for template matching is longitudinally and laterally doubled, and the value of this size is included in the analytic basic information. In this manner, more accurate matching processing can be achieved even in an environment susceptible to false recognition. When the similarity of the registered information is low, the template size is reduced in accordance with the number of registrations. That is, when the number of registrations is large, an attempt is made to reduce the template size to the extent that false recognition does not occur (to the extent that the similarity of the registered information does not exceed the set value) in order to reduce the time required for the matching processing. When the similarity of the registered information is low, the data gradation of the template may be lowered. For example, a gray scale of 256 gradations is common, but the gradations may be reduced to 16. Moreover, when the similarity of the registered information is low, a high threshold value of matching may be set to avoid false recognition.

Figure 5:
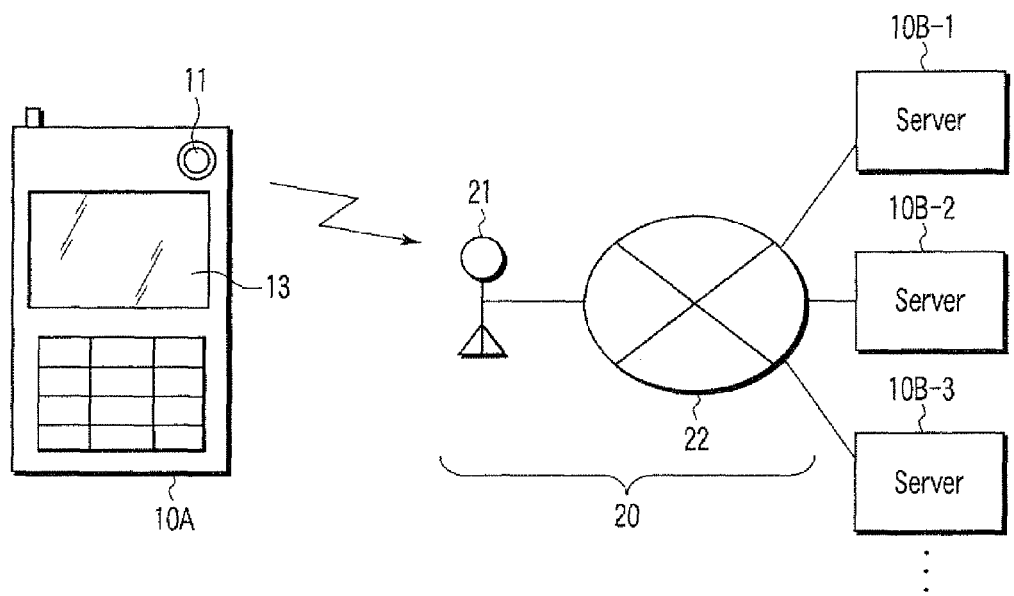
FIG. 5 is a diagram showing the configuration of the information presentation system when a plurality of servers are used and the information presentation terminal is configured as a mobile telephone.

In addition, the server 10B including the peripheral information acquisition unit 14, the storage unit 15 and the analytic basic information construction unit 16 is not limited to one in number, and a plurality of servers 10B may be prepared. When the information presentation terminal 10A is a mobile telephone, the configuration of the information presentation system according to the present second embodiment is, for example, as shown in FIG. 5. That is, as shown in FIG. 5, the information presentation system has a configuration in which a plurality of servers 10B-1, 10B-2, 10B-3 . . . are connected to a communication line 20. In addition, this communication line 20 is configured by the base station 21 and a network 22. Further, the servers 10B-1 to 10B-3 are connected to the network 22. In such a case, the pertinent information acquisition unit 12 of the information presentation terminal 10A may acquire analytic basic information from the plurality of servers 10B-1, 10B-2, 10B-3 . . . . Moreover, the analytic basic information construction unit 16 of one server 10B

(e.g., the server 10B-1) may acquire information from at least one server 10B (e.g., the server 10B-2, 10B-3 . . . ) other than the former server 10B (e.g., the server 10B-1), and after combining the information, construct analytic basic information to be transmitted to the information presentation terminal 10A.

Third Embodiment

Figure 6:
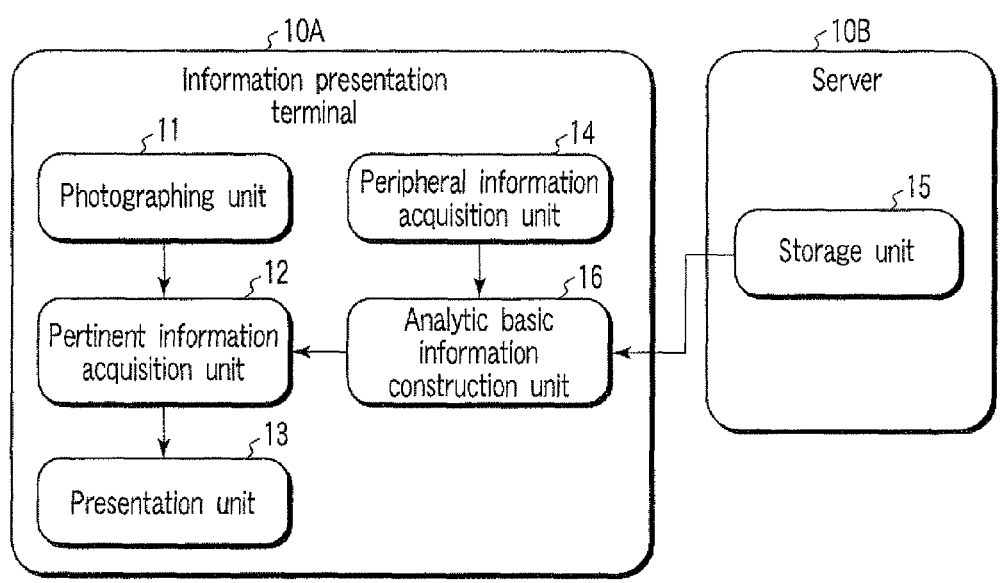
FIG. 6 is a block configuration diagram of an information presentation system according to a third embodiment of the present invention.

As in the second embodiment described above, an information presentation system according to a third embodiment of the present invention is divided into an information presentation terminal 10A and a server 10B. The information presentation terminal 10A is connected to the server 10B by a communication line. However, in the present embodiment, the information presentation terminal 10A includes the photographing unit 11, the pertinent information acquisition unit 12, the presentation unit 13, the peripheral information acquisition unit 14 and the analytic basic information construction unit 16, as shown in FIG. 6. The server 10B is configured to only include the storage unit 15.

According to such a configuration, registered information acquired from the server 10B is constructed as analytic basic information on the information presentation terminal 10A, so that once the registered information is downloaded, peripheral information in the information presentation terminal 10A can be adapted well.

Fourth Embodiment

As in the second and third embodiments described above, an information presentation system according to a fourth embodiment of the present invention is divided into an information presentation terminal 10A and a server 10B. The information presentation terminal 10A is connected to the server 10B by a communication line. However, in the present embodiment, the information presentation terminal 10A only has the photographing unit 11 and the presentation unit 13, as shown in FIG. 7. The server 10B has the other units: the pertinent information acquisition unit 12, the peripheral information acquisition unit 14, the storage unit 15 and the analytic basic information construction unit 16. However, as shown in FIG. 7, the peripheral information acquisition unit 14 of the server 10B acquires, via the communication line, GPS information or time information from, for example, a sensor provided in the information presentation terminal 10A, and peripheral information (including peripheral information transmitted from a base station 21) such as images from the photographing unit 11 for acquiring information on, for example, brightness.

With such a configuration, a user does not have to download analytic basic information to the information presentation terminal 10A in advance. Moreover, the server 10B can perform processing based on the optimum analytic basic information which is transmitted together with a taken image and which corresponds to the peripheral information in the information presentation terminal 10A.

Fifth Embodiment

Figure 8:
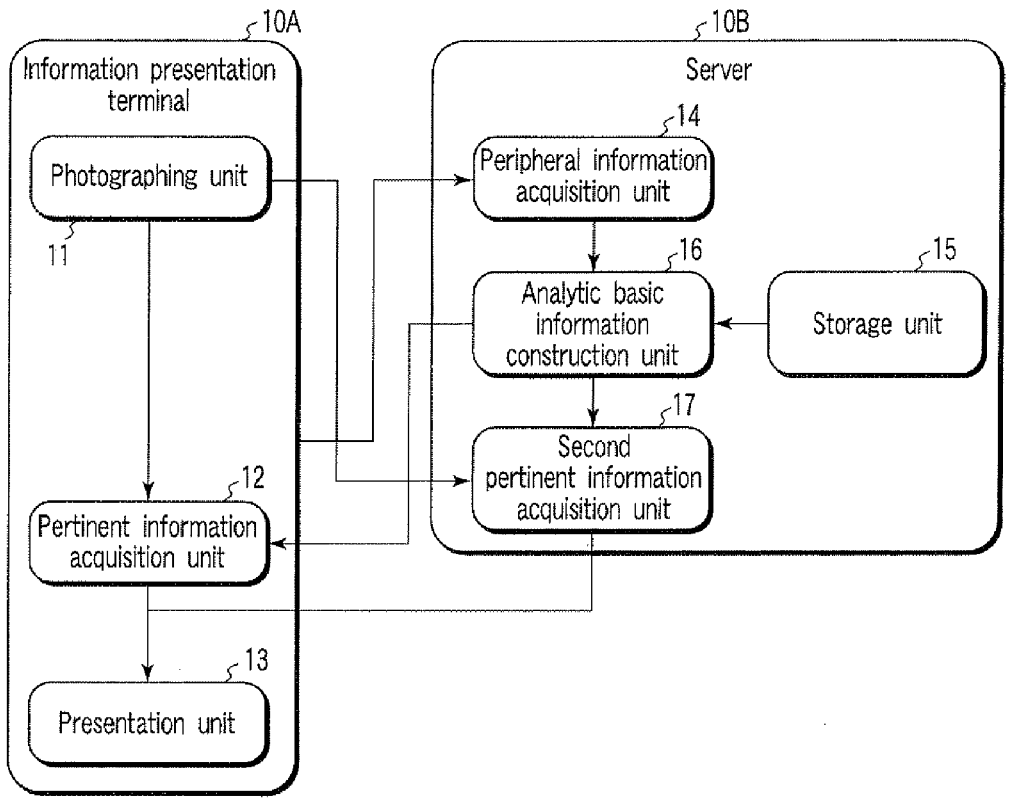
FIG. 8 is a block configuration diagram of an information presentation system according to a fifth embodiment of the present invention.

In an information presentation system according to a fifth embodiment of the present invention, a second pertinent information acquisition unit 17 having a function equivalent to that of the pertinent information acquisition unit 12 is further provided in a server 10B in the configuration of the second embodiment, as shown in FIG. 8. Here, the second pertinent information acquisition unit 17 acquires pertinent information from more analytic basic information than the analytic basic information acquired by the pertinent information acquisition unit 12.

Figure 9:
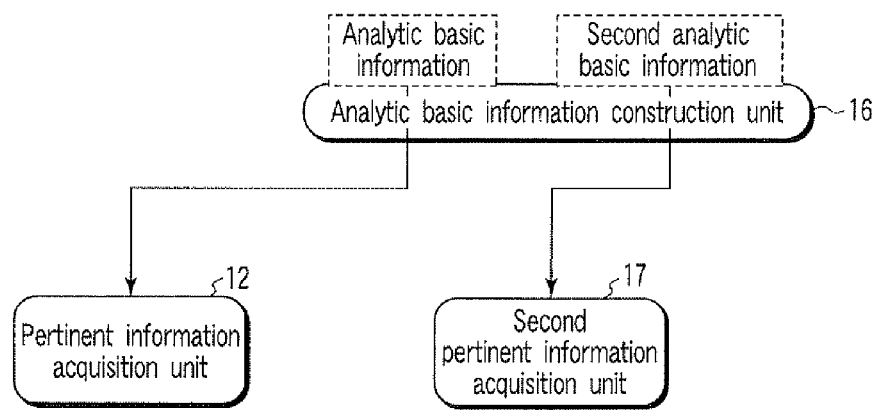
FIG. 9 is a diagram for explaining the relation of an analytic basic information construction unit to a pertinent information acquisition unit and a second pertinent information acquisition unit.

That is, in the present embodiment, a peripheral information acquisition unit 14 of the server 10B acquires, via a communication line, GPS information or time information from, for example, a sensor provided in the information presentation terminal 10A, and peripheral information (including peripheral information transmitted from a base station 21) such as images from a photographing unit 11 for acquiring information on, for example, brightness, as shown in FIG. 8. Then, as shown in FIG. 9, an analytic basic information construction unit 16 constructs analytic basic information of high priority and second analytic basic information of lower priority on the basis of the peripheral information acquired by the peripheral information acquisition unit 14. The analytic basic information is downloaded to the pertinent information acquisition unit 12 of the information presentation terminal 10A via the communication line. Moreover, the second analytic basic information is provided to the second pertinent information acquisition unit 17.

With such a configuration, the presentation unit 13 can present the result in the second pertinent information acquisition unit 17 even when the pertinent information acquisition unit 12 of the information presentation terminal 10A cannot acquire the pertinent information.

For example, when a mobile telephone is conceived as the information presentation terminal 10A, mobile telephones have different storage capacities depending on the model. An available storage capacity varies depending on the usage of the user. Moreover, the processing speed varies depending on the model. Therefore, it is preferable to change the capacity of the analytic basic information to be downloaded on the model so that an excessive burden is not imposed on the processing on the mobile telephone. Thus, in the present embodiment, analytic basic information which has not been downloaded is held on the server 10B. Then, the second pertinent information acquisition unit 17 of the server 10B performs processing to acquire pertinent information from the second analytic basic information which is the un-downloaded analytic basic information, for an image transmitted from the mobile telephone or part of the image. When the pertinent information can be acquired on the mobile telephone, this information is displayed on the presentation unit 13. On the other hand, when the pertinent information cannot be acquired on the mobile telephone but can be acquired on the server 10B, the information acquired on the server 10B is presented on the presentation unit 13 of the mobile telephone. Otherwise, when the information can be acquired earlier on the server 10B while processing is also being performed on the mobile telephone, the information acquired on the server 10B is likewise presented on the presentation unit 13 of the mobile telephone.

For example, a template set for a range of 500 m around is acquired as the analytic basic information on the basis of position information for the mobile telephone, and downloaded to the mobile telephone. The user can therefore walk around town while obtaining information on surrounding shops by the template set. If the user moves 500 m or more away from the position where the template set has been initially acquired, relevant information cannot be obtained any more with the template acquired in the mobile telephone. However, in the present embodiment, the image acquired by the mobile telephone is also transmitted to the second pertinent information acquisition unit 17 of the server 10B. The server 10B passes a template set for a range of 4 km around to the second pertinent information acquisition unit 17 when the user initially downloads the template set for a range of 500 m around. Thus, even if the user cannot acquire information from within the mobile telephone, information can be acquired from the template set for a range of 4 km around in the second pertinent information acquisition unit 17 on the server. When the information is acquired on the server 10B and the information cannot be acquired on the mobile telephone, the information acquired on the server 10B is displayed. Therefore, the user can use the template data of an area exceeding the capacity of the mobile telephone. At this moment, a template set for a range of 500 m around based on the current position may be transmitted to the mobile telephone. This enables a sense of light operation because information can be again acquired by the mobile telephone alone within 500 m from that position.

As described in connection with the embodiments, information to be used, such as the template data to be targeted for recognition by the system, information pertinent to the template data and various parameters for recognition processing is changed in accordance with various information on, for example, the environment and the model to be used, such that the information optimum for the situation can be presented depending on the environment.

Although the present invention has been described above in connection with the embodiments, it should be understood that the present invention is not limited to the embodiments described above, and various modifications and applications can be made within the spirit of the present invention.

For example, in the fifth embodiment, the server 10B comprises the second pertinent information acquisition unit 17, and the analytic basic information construction unit 16 constructs the analytic basic information and the second analytic basic information. However, the present invention is not limited to such a configuration, and more pertinent information acquisition units such as a third pertinent information acquisition unit, a fourth pertinent information acquisition unit, and so on, may be configured in the server 10B, and the analytic basic information construction unit 16 may further construct third analytic basic information, fourth analytic basic information, and so on.

Sixth Embodiment

Figure 10:
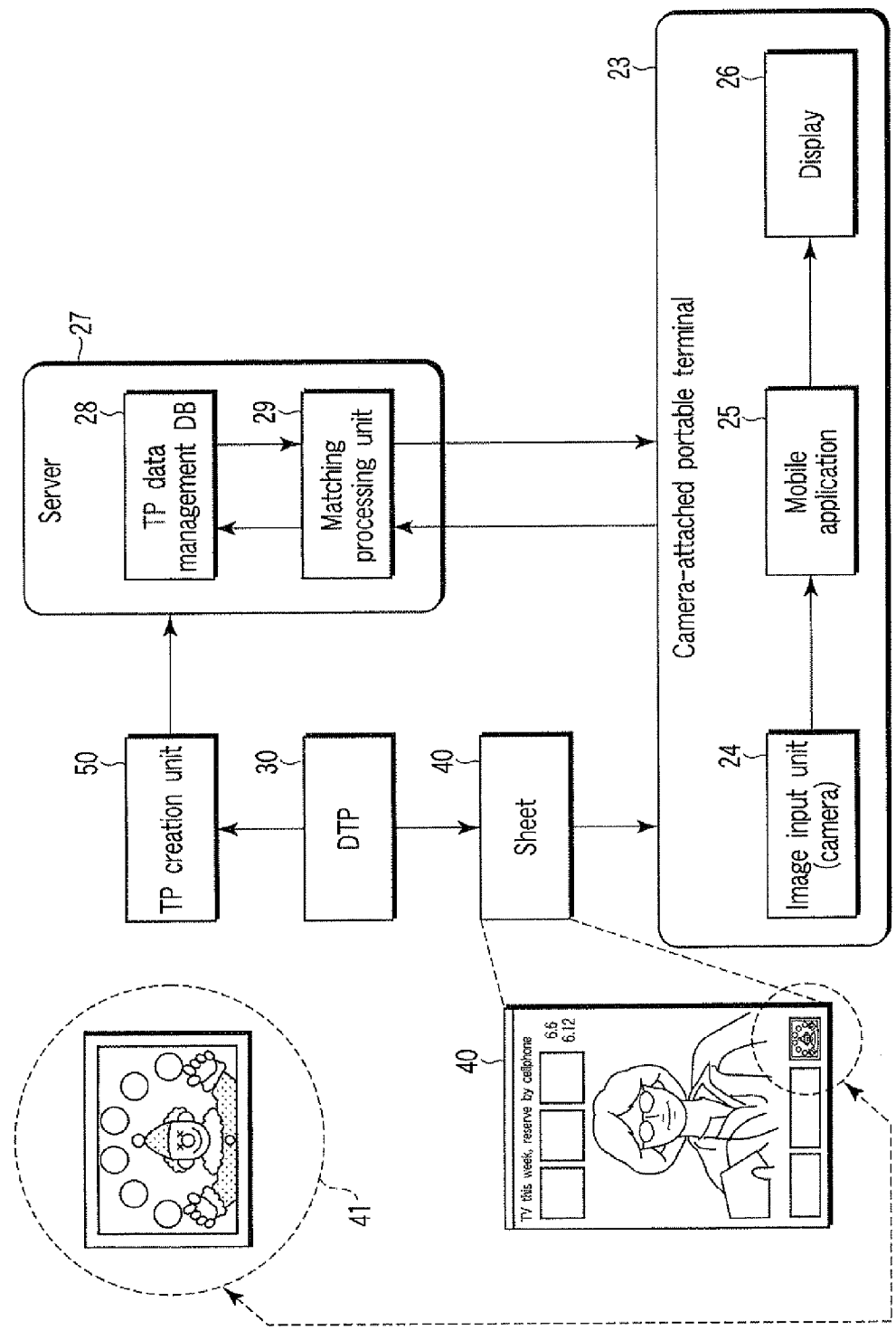
FIG. 10 is a diagram showing the configuration of a search system according to a sixth embodiment of the present invention.
Figure 11:
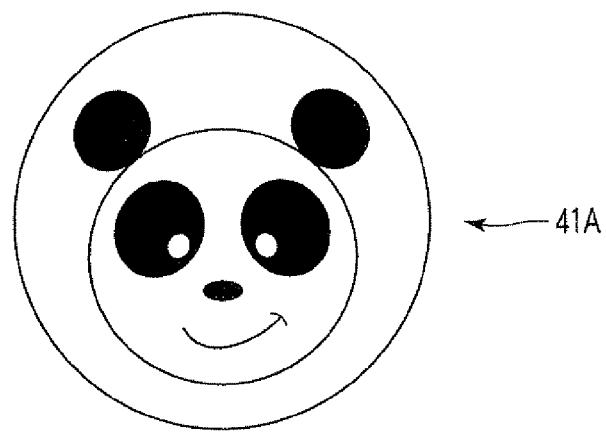
FIG. 11 is a diagram showing one example of an object image.
Figure 12:
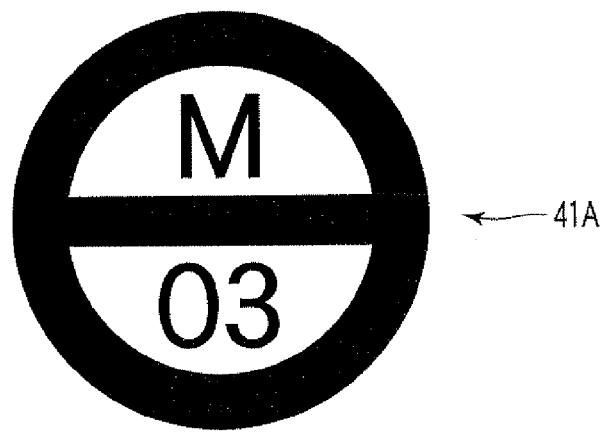
FIG. 12 is a diagram showing one example of an object image.
Figure 13:
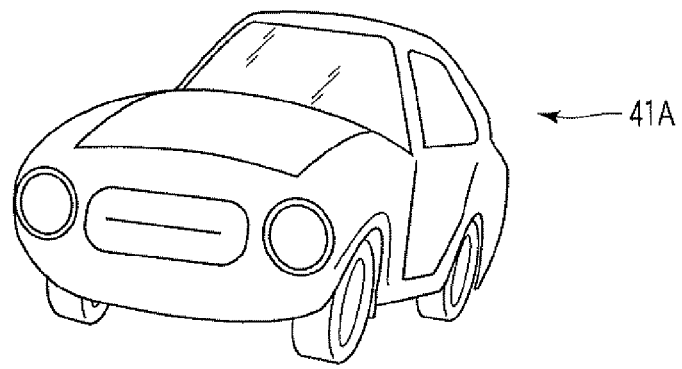
FIG. 13 is a diagram showing one example of an object image.
Figure 14:
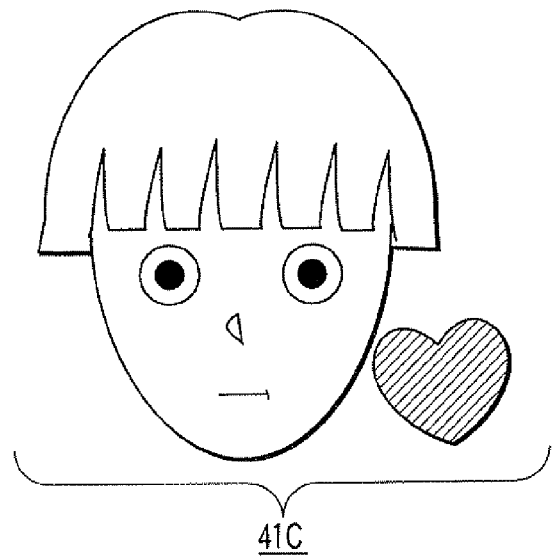
FIG. 14 is a diagram showing one example of an object image.

A search system according to a sixth embodiment of the present invention comprises a camera-attached portable terminal 23 such as a camera-attached mobile telephone or a camera-attached PDA, and a search means, as shown in FIG. 10. The camera-attached portable terminal 23 includes an image input unit (camera) 11 for inputting an image, and a display 26 for outputting an image as a search result. The search means uses a hierarchically managed template to search a database for an image on the basis of the image input into the image input unit 24. In addition, the search means is obtained by portable application software 25 of the camera-attached portable terminal 23, and a matching processing unit 29 configured in a server 27 which can communicate with the camera-attached portable terminal 23.

The server 27 further has a template (TP) data management database (DB) 28 in which a plurality of templates are registered and which hierarchically manages these templates. The templates registered in the TP data management DB 28 are created by a TP creation unit 50 from an object image 41 disposed in a sheet 40 as shown in FIG. 10 by desktop publishing (DTP) 30.

That is, in the search system according to the present sixth embodiment, the object image 41 is printed on the sheet 40 in advance by the DTP 30, and the templates of the object image

41 are created in the TP creation unit 50. Then, the created templates are registered in the TP data management DB 28 of the server 27. In addition, such creation and registration of templates are repeated when there are a large number of object images 41 to be registered.

Then, when the user desiring to conduct a search uses the image input unit 24 of the camera-attached portable terminal 23 to take in the object image 41 from the sheet 40, the portable application software 25 extracts image characteristics from the input image. The portable application software 25 then sends the extracted characteristic data to the matching processing unit 29 of the server 27. Further, the matching processing unit 29 matches the characteristic data with the templates registered in the TP data management DB 28. In this case, template matching using hierarchically lower templates is carried out after template matching using hierarchically higher templates in order to narrow down an image to be searched for. If a matching result is acquired, the matching processing unit 29 sends information on the matching result to the portable application software 25 of the camera-attached portable terminal 23. The portable application software 25 displays the resultant information on the display 26.

In addition, the following advantages are provided in the case of using an object image in which a registration area, that is, an area as a recognition target is clear, as in the object image 41 shown in FIG. 10: When the object image 41 is registered in the TP data management DB 28, an evaluation is made of the similarity between the object image desired to be registered and the image already registered in the TP data management DB 28. If, for example, the result of the evaluation is that the similarity (a numerical value indicating the degree of similarity) between these images is 75% or more in the matching, the object image 41 is not registered in the TB data management DB 22, such that it is possible to prevent the reregistering of the object image similar to the image already registered in the TP data management DB 28.

This can stably avoid false recognition in the matching. In addition, a threshold value for judging whether to execute the registration processing is set at 75% here for convenience, it goes without saying that the threshold value is not limited to 75%. Here, it is desirable that the threshold value for judging the similarity in the matching be set to the highest possible value within numerical values that do not cause false recognition in the environment where the matching is used. In addition, the above-mentioned threshold value is not exclusively set in a static manner as one element of the system, and may naturally be set in a dynamic manner in accordance with the conditions of the matching (e.g., the inclination of the camera during photography, the stability of illumination, the number of pixels in the photography of the camera, the kind of information used in the matching, a method of matching, etc.).

Furthermore, the object image 41 may be registered in the TP data management DB 28 after properly deformed (e.g., the addition of, for example, noise). Such proper deformation allows the object image 41 to be closer to a state photographed and acquired by an actual camera. This is effective in the evaluation of the similarity. That is, the evaluation of the similarity is made not only of the image before properly deformed but also of the image after properly deformed, such that the accuracy in the similarity evaluation is increased.

In addition, the proper deformation includes various kinds of image processing operations such as rotation, three-dimensional affine transformation, enlargement, reduction, deterioration of color information, addition of white noise, and simulation of reception with various kinds of illumination.

Furthermore, when an image similar to the image desired to be registered is in the TP data management DB 28, the processing is not limited to the above-mentioned processing in which registration is rejected. That is, for example, the user may be informed that an image similar to the image desired to be registered is in the TP data management DB 28 so that the user himself selects whether to register the image. In addition, such processing is one effective way in providing the same information to the images similar to each other.

Moreover, it is effective in an actual system that the above-mentioned processing for rejecting the registration and the registration selection processing by the user are selectively presented to the user depending on the circumstances. That is, assume that, for example, there are a plurality of accounts having registration authority in the TP data management DB 28. In this case, the user, in general, is not permitted to view information concerned with accounts other than his own account. A case is conceived where, in such a system, when, for example, an account A is to register an image C in the TP data management DB, the image C is similar to an image already registered by an account B in the TP data management DB. In such a case, it is reasonable that the matching processing unit 29 rejects the registration of the image C for the reason that a similar image has been found in the TP data management DS 28. Another case is conceived where the account B is to again register the image C in the TP data management DB 28. In such a case, it is reasonable that the matching processing unit 29 displays information on the image C already registered by the account B and performs processing for leaving the user to judge whether to register the image, informing that "Your image is similar to this image. Register?". Thus, performing the most reasonable processing depending on the situation so that the user of the system can avoid the risk of false recognition is important in an actual service.

In addition, in such a matching system, the image to be used as the object image 41 is not limited to the object image 41 shown in FIG. 10 which is divided into areas by obvious square frames. It should be understood that the object image 41 may be an object image 41, for example, configured as shown in FIGS. 11 to 14. That is, various images can be used as the object image, such as an object image 41A having arbitrarily shaped frames, including circles and curves (see FIGS. 11 and 12), object images 41B and 41C including no frames originally (see FIGS. 13 and 14, respectively), and the object image 41C in which, for example, a symbol mark is located in the vicinity of a particular design (see FIG. 14).

Here, when an image such as the object images 41B and 41C not limited by obvious frames in areas targeted for registration is used as the object image, the following matching is performed: First, a plurality of characteristic points are extracted from an input image. Then, a group of these characteristic points are compared with a group of characteristic points which are registered in advance in the TP data management DB 28 object by object. The images are matched with each other by this comparison to check whether these are the same object image.

In addition, in actual matching, when a value indicating the degree of similarity in accordance with the difference of characteristic amounts between the characteristic points exceeds a preset threshold value, the matching processing unit 29 judges that these characteristic points are similar to each other. For example, the matching processing unit 29 judges that, among the objects registered in the TP data management DB 28, an object in which a predetermined number of characteristic points are judged to be similar to the characteristic points of the object of the input image is the same as the object of the input image.

Here, the characteristic point means a point which is different in characteristic amount from other pixels at a given level or more in an image. The difference includes, for example, contrast between brightness and darkness, color, the distribution of surrounding pixels, the value of a differential component, or the difference of arrangement between the characteristic points. In addition, when matching by such a comparison of the characteristic point groups is used, the characteristic points are extracted from each object in advance and registered in the TP data management DB 28 for each object.

When the matching based on the characteristic points is carried out as described above, an option to "register the object image desired to be registered and/or the registered image in a divided manner" is conceivable other than the option to "reject the registration" or "register knowing the similarity", in the case where an image similar to the input image is found in the group of images already registered in the TP data management DB 28. According to this option to "register the object image desired to be registered and/or the registered image in a divided manner", a database capable of avoiding false recognition can be constructed while the number of images that cannot be registered is minimized.

Figure 15:
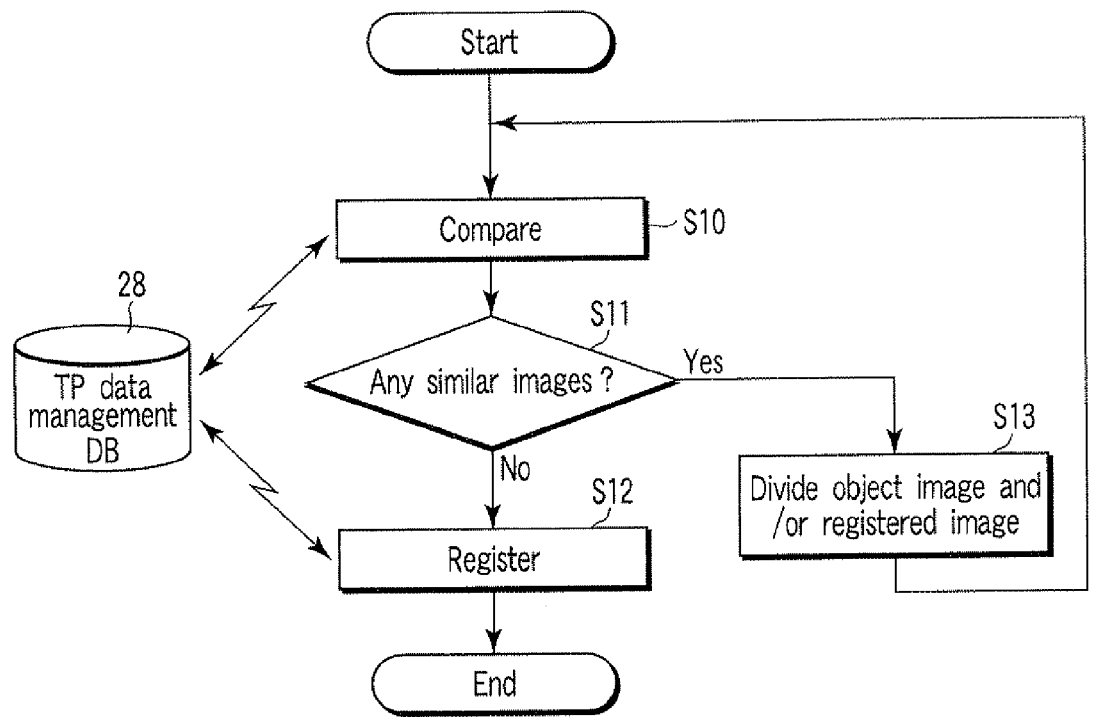
FIG. 15 is a flowchart showing processing for comparing an input object image desired to be registered with an image registered in a TP data management DB and then registering the object image.

When the option to "register the object image desired to be registered and/or the registered image in a divided manner" is taken into consideration, for example, the TP creation unit 50 matches an input object image desired to be registered with a comparison image registered in the TP data management DB 28, in accordance with a flowchart shown in FIG. 15. In addition, the flowchart shown in FIG. 15 shows operation control performed by the TP creation unit 50 only in the case of "registering the object image desired to be registered and/or the registered image in a divided manner" for convenience of explanation.

First, an input image input by the user, which is the image desired to be registered, is compared with an image registered in the TP data management DB 28 (hereinafter referred to as a registered image) (step S10). Then, it is judged whether the input image is similar to the registered image (step S11). If step S11 branches to NO, the input image is registered in the TP data management DB 28 (step S12). It should be understood that the selection of whether to register the input image in the TP data management DB 28 may be left to the user in step S12, for example, as shown in FIG. 16. In this case, the input image is registered only when the user selects to register the input image in the TP data management DB 28.

On the other hand, if step S11 branches to YES, parts of the input image similar to the registered image are identified, and the similar parts are divided and deleted (step S13). In other words, this step S13 is a step of creating an image in which the parts of the input image similar to the registered image are deleted.

Then, after the processing in step S13 is finished, a return is made to step S10. Thus, a series of processes in step S10, step S11 and step S13 is repeated, thereby creating an image in which all the parts similar to the registered image are deleted from the input image.

A presentation method as shown in FIG. 16 is conceivable when the image created by the division and deletion is presented to the user. That is, this method includes presenting both the input image and the registered image judged to be similar to the input image, and clearly indicating parts used to judge the similarity between these images. Such illustration is effective in raising the efficiency of registration. Moreover, for example, as shown in FIGS. 17 and 18, the registered images judged to be similar to the input image may be displayed in a list form and thus presented to the user.

Figure 17:
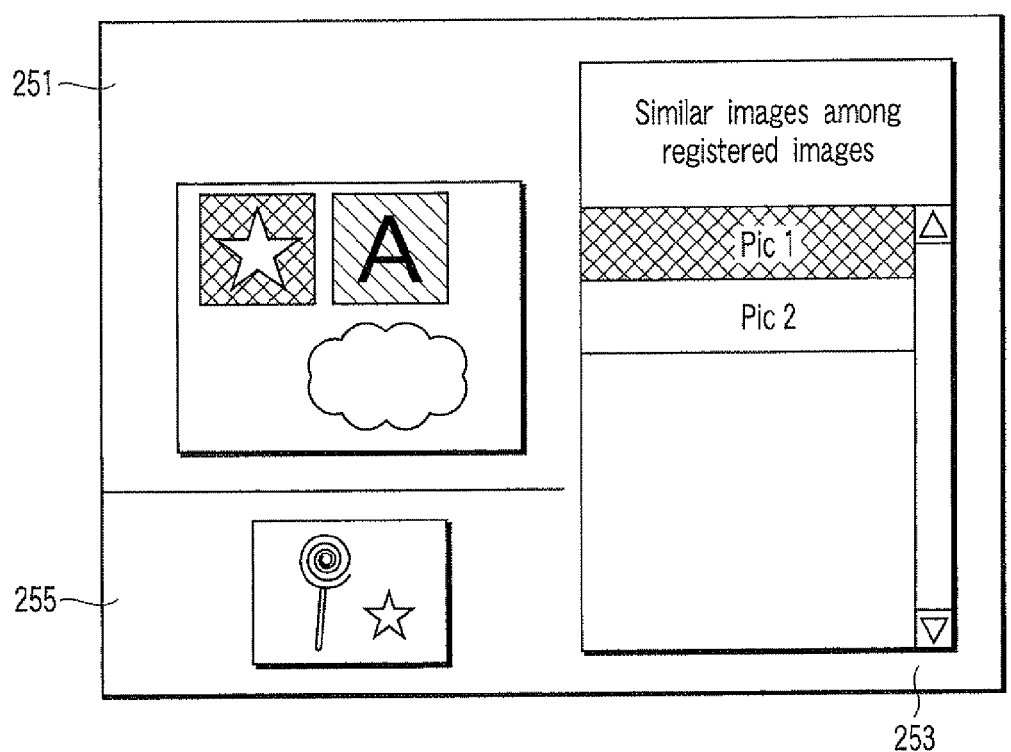
FIG. 17 is a diagram showing one example of a display method which displays to a user, in a list form, an image similar to the image desired to be registered, among the images registered in the TP data management DB.
Figure 18:
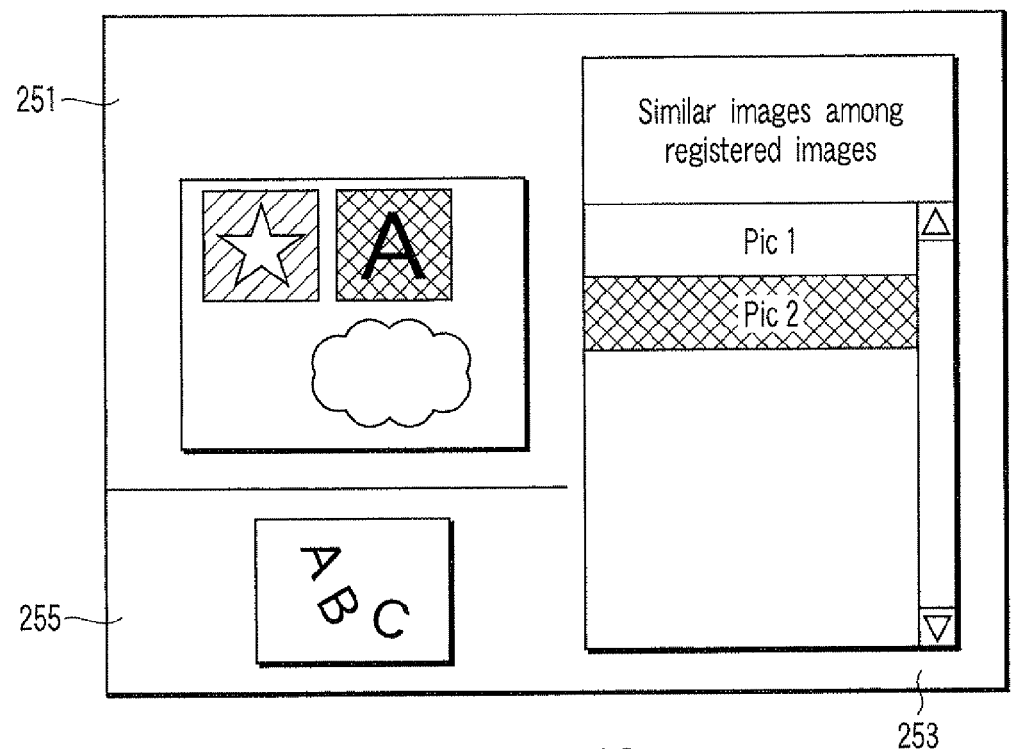
FIG. 18 is a diagram showing one example of a display method which displays to the user, in a list form, an image similar to the image desired to be registered, among the images registered in the TP data management DB.

That is, as shown in FIGS. 17 and 18, a display screen is divided into three areas, including an input image display area 251, a list display area 253 and a selected image display area 255. If a registered image is selected in the list display area 253, as indicated by hatching, the selected image is displayed in the selected image display area 255. Moreover, an indication (hatched parts in FIGS. 17 and 18) to differentiate from the registered image is provided in the input image displayed in the input image display area 251.

On the other hand, when there are, in the TP data management DB 28, a plurality of registered images similar to the input image desired to be registered, similar parts are sequentially divided and deleted, and the part that finally remains is determined to be the input image to be newly registered, for example, as shown in FIG. 19.

Figure 20:
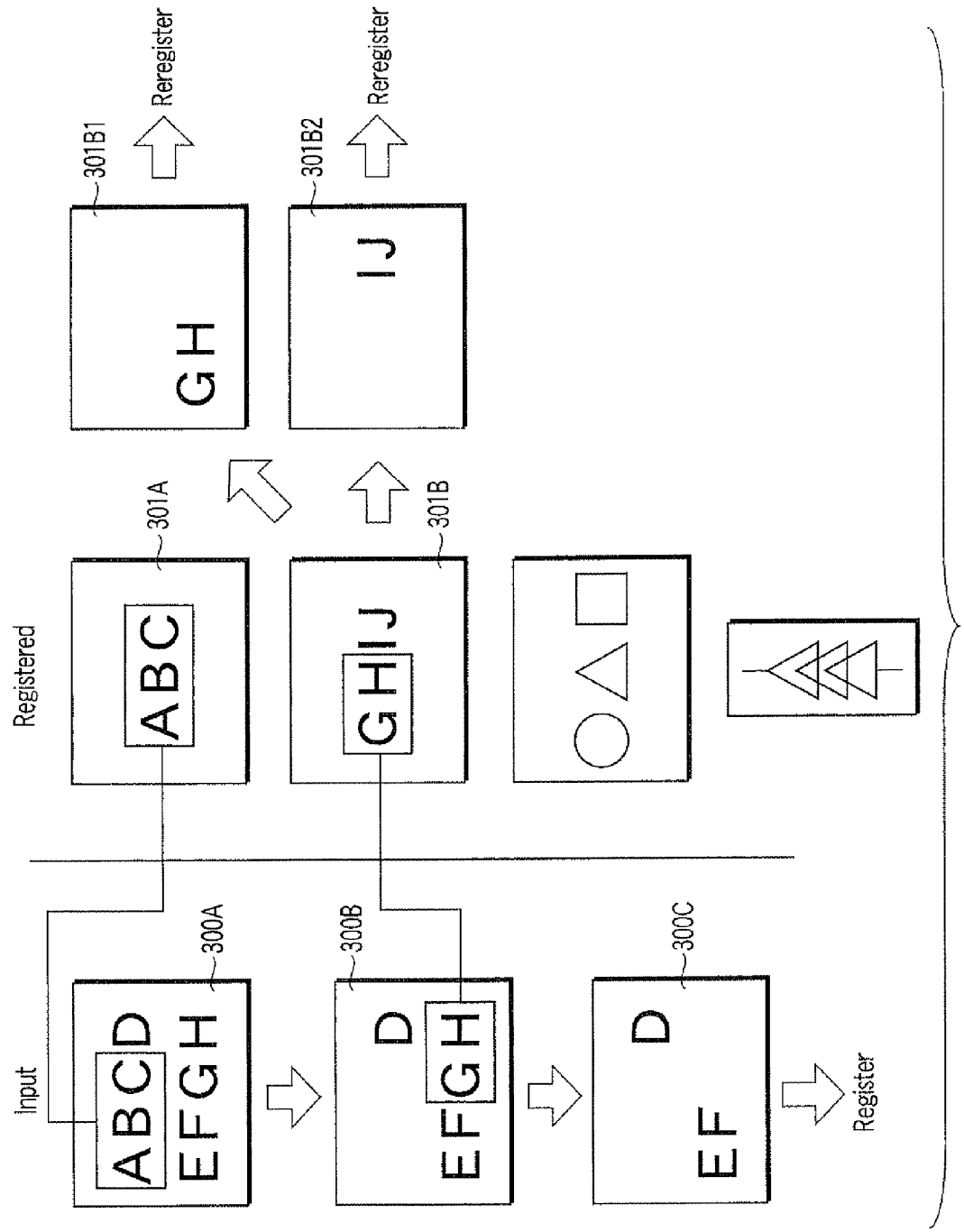
FIG. 20 is a diagram showing a process of deleting and reregistering the image already registered in the TP data management DB.

The processing for dividing and deleting the input image desired to be registered has been described so far. However, the input image alone does not necessarily have to be divided and deleted. That is, it goes without saying that processing for dividing and deleting the registered image may be carried out. Moreover, as shown in FIG. 20, both the input image and the registered image may be divided and registered in the following manner: First, as a logo "ABCDEFGH" contained in an input image 300A is similar to a logo "ABC" contained in a registered image 301A, "ABC" in the input image 300A is divided and deleted to create an input image 300B. Then, as a logo "DEFGH" contained in the input image 300B is similar to a logo "GHIJ" contained in a registered image 301B, the registered image 301B is divided into an image 301B1 only composed of "GH" and an image 301B2 only composed of "IJ". Then, both the image 301B1 only composed of "GH" and the image 301B2 only composed of "IJ" are reregistered in the TP data management DB 28. Further, the input image 300B is registered in the TP data management DB 28 as an image 300C after the division.

According to the above-mentioned method of dividing and registering the image, an embodiment significantly useful in actual service, for example, as shown below is obtained.

For example, in products of the same manufacturer or products of the same brand, a brand logo specific to the products of the manufacturer or the products of the brand, and, for example, a product name or icon (the product name or icon is generically referred to as a product name) unique to the products are generally printed on the packaging of the products. In such a case, according to the present embodiment, the brand logo and the product name are registered in the TP data management DB 28 in a divided manner. This produces the following advantage:

For example, even when an image illustrated with a brand logo and a product name called A is already registered in the TP data management DB 28 as a "product A", the registration of this image is not rejected for the reason that an image illustrated with the same brand logo and a product name other than A is similar to the "product A". That is, according to the present embodiment, the "product A", which is a registered image, is divided into the brand logo and the product name A. Then, the brand logo and the product name A are independently reregistered. Specifically, the image illustrated with the brand logo is registered as a "brand logo", and the image illustrated with the product name A is registered as a "name of the product A".

Furthermore, in the present sixth embodiment, a concept "combination information" is introduced. This combination information is as follows: For example, assume a case where a combination of the "brand logo" and the "name of the product A" is registered as the "product A". In this case, information indicating that the combination of the "brand logo" and "name of the product A" is the "product A" is the "combination information". In addition, when the "combination information" is registered in the TP data management DB 28, the image showing the "brand logo" and the image showing the "name of the product A", in this case, are registered in the TP data management DB 28 at the same time.

In addition, when the input image desired to be registered and/or the registered image are/is divided, it is not always necessary to register images produced by the division. For example, pictures showing used cars or other products often have similar backgrounds. Here, assume a case where, for example, an image of a car A with a background has been registered in the TP data management DB 28. In such a case, when a picture showing a car B with a background similar to that in the picture showing the car A is to be registered in the TP data management DB 28, this background can be extracted in a divided manner according to the present sixth embodiment. In such a case, if the user does not particularly feel the need to register this background portion, the background portion can naturally be designed not to be targeted for registration. This permits the user, that is, the information provider, to register, in the TP data management DB 28, only the portions that are desired to be matched. Therefore, it is possible to avoid false recognition caused by the similarity of the background portions between the input image and the registered image.

It should also be understood that "information expressed by the image" may be managed in accordance with the combination of the above-mentioned divided images. Here, the information expressed by the image includes, for example, a URL to which the image corresponds, a resource ID inside an application, music information, and information regarding a position on a map. For example, in the example shown in FIG. 20, while the image 301B containing "GHIJ" is registered after being divided into the image 301B1 containing "GH" and the image 301B2 containing "IJ" as described above, it goes without saying that the information expressed by the image may be provided to a collection of the image 301B1 containing "GH" and the image 301B2 containing "IJ". Likewise, in the example shown in FIG. 20, the information expressed by the image may naturally be provided to the image 300A containing all of "ABC", "GH" and "DEF".

In other words, the information expressed by the image is managed as the OR of images containing a predetermined logo, and only provided to the image satisfying a predetermined logical condition. Owing to such elaboration, an input image can be registered in the TP data management DB 28 as a collection of predetermined registered images after being provided with the information expressed by the image even if no portions dissimilar to the registered images are found in the input image as a result of the division of this input image.

It should be understood that a more complex logical expression can be used, without limitation to the OR. For example, assume that "GH" is an essential element (an element in an OR for providing a given image with the information expressed by the image) in the input image 300 shown in FIG. 20. Then, a description such as "GH" AND ("ABC" OR "DEF") can be used as the logical expression for managing the essential element. In this manner, the information expressed by the image can be managed by a free logical expression per divided image.

For example, the essential element is used as a symbol indicating an object image which is a photography target, such that this image can be clearly indicated to the user that it is the object image, and stable matching can be achieved. Moreover, the importance of characteristic points in areas around the essential element may be weighted so that it is higher in importance than other characteristic points, and the similarity may be judged in consideration of this weighting in the matching processing. This enables more stable and effective matching processing.

Furthermore, a NOT logical expression may be used as a logical expression. For example, when the logo A is a registered image, a person who is to newly register a logo B describes the registered image logo A and the logo B which is to be registered by this person in the relation of NOT, such that the simultaneous recognition of the logo A and the logo B can be avoided during matching. Using the NOT logical expression is effective, for example, in the case where the logo A and the logo B are used by, for example, companies competing with each other. It should be understood that information on such a competing relation may be registered in the system in advance so that the system automatically describes the NOT relation and registers a predetermined logo and a logo used by, for example, a competing company on the basis of the competing relation information. Here, the competing relation information is a database of various designs used by competing companies in a certain field.

In addition, when the OR is used in this manner, a judgment in the matching is facilitated if a portion not present in the registered image is contained in the input image, such as "DEF" in the image 300A in the example shown in FIG. 20.

It should be understood that the relation between images in accordance with the above-mentioned various logical expressions can be described and constructed in the process of dividing the image. In addition, the matching is carried out by the server 20 in cooperation with the application 25 on the portable terminal 23 in the configuration of the present sixth embodiment, and the application 25 naturally includes so-called electronic mail. That is, it is naturally possible that the user transmits the input image to the server as an attachment to an electronic mail for the matching of the input image. In this case, the result of the matching processing is distributed to the user by electronic mail.

Figure 21A:
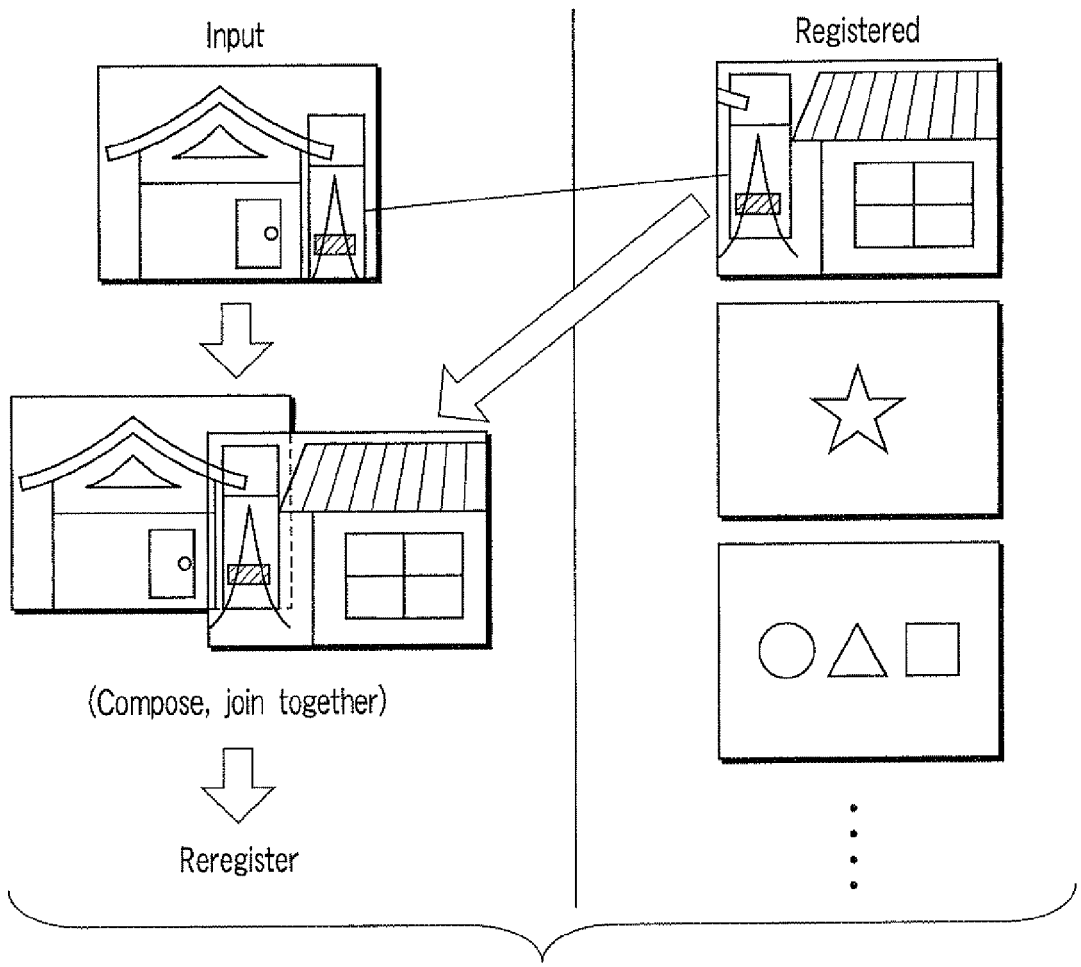
FIG. 21A is a diagram showing a process of composition by the superposition of similar parts when there is, in the TP data management DB, an image having parts similar to parts of the object image desired to be registered.
Figure 21B:
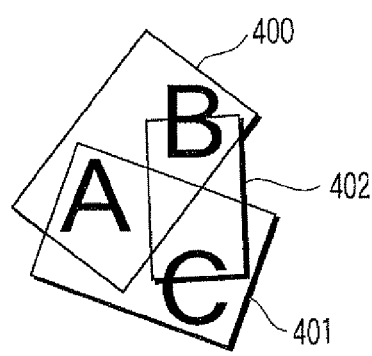
FIG. 21B is a diagram showing a process of composition by the superposition of similar parts when there is, in the TP data management DB, an image having parts similar to parts of the object image desired to be registered.

In addition, processing which can be employed when a registered image similar to the input image desired to be registered is found is not limited to the above-mentioned processing in which the input image and/or the registered image are/is divided. That is, the following processing is also possible:

For example, a process is conceived wherein, when an input image is judged to be similar to a registered image, the similar portions are superposed on each other to compose the input image with the registered image, as shown in FIG. 21A. Moreover, a case is assumed where an image 402 containing part of "B" and part of "C" is matched as an input image, as shown in FIG. 21B. Here, if, before the matching, an input image 400 containing "A" and "B" has been composed with a registered image 401 which includes an input image containing "A" and "C" and the composed image has been registered in the TP data management DB 28, the matching can be accurately performed. That is, such elaboration makes it possible to return a highly accurate matching result to the user.

In addition, if a meaning such as classified elements or independent elements is assigned to each of the image elements created when the input image and/or the registered image are/is divided, the system can be operated as a system for performing hierarchical image recognition. Moreover, the TP data management DB 28 retaining various kinds of information on the division can be effectively used in judgment during the above-mentioned logical expression matching based on the image elements created by the division.

Seventh Embodiment

An embodiment will hereinafter be described wherein a moving image is assumed as a template to be created by a TP creation unit for creating a template image used in matching processing.

A moving image is composed of, for example, 30 sequential still images per second. Thus, when a moving image is registered as a TP in a TP data management DB, which is a means for recording templates created in the TP creation unit, this moving image is treated as a sequence of still images. However, it is not necessary to register all the frames of still images composing the moving image. That is, after the still image of a certain frame is once registered in the TP data management DB, the still image of this frame may be additionally reregistered in the TP data management DB only when the still images of frames following this still image satisfy a certain standard, as shown below.

Firstly, the use of the similarity is conceived as a certain standard. In this case, an evaluation is made of the similarity between the still image of the frame once registered in the TP data management DB and the still images of the frames following this still image, and the still image of the frame once registered may be additionally reregistered in the TP data management DB only when the similarity is equal to or higher than a predetermined value. For example, a similarity of 75% or less may be set as the predetermined value of the similarity.

Secondly, the use of the number of the characteristic points is conceived as the certain standard. That is, in this method, when the number of characteristic points found in a registered still image has decreased to a certain threshold value or less in still images following the registered still image, the still image is additionally registered.

Thirdly, the use of the moving distance of the characteristic point is conceived as the certain standard. That is, a characteristic point found in the registered still image is tracked in the following still images, and this still image may be additionally registered if the moving distance of the characteristic point is equal to or more than a threshold value.

The inventor of the invention of the present application has ascertained that even if a moving image is composed of 120 still images, the above-mentioned methods actually enable stable matching of one scene of any position in this moving image when six still images are only registered.

In addition, the still images to be registered as a moving image are not exclusively treated independently, but are preferably registered in the TP data management DB together with information on the order of the still images in the moving image. This, in combination with the use of the order information in matching, enables more stable matching and the avoidance of false recognition.

A specific explanation will be given below with reference to one example of the configuration of an object recognition system shown in FIG. 22. When a camera-attached portable terminal 23 is connected to a TP data management DB 28 in a server by, for example, a television telephone network, still images are sequentially transmitted from an image input unit (not shown) in the camera-attached portable terminal 23 to the TP data management DB 28 in the server. At the stage where a matching processing unit (not shown) in the server has recognized a still image B among the sequentially transmitted still images, the matching processing unit cannot yet determine a registered moving image (moving image registered in the TP data management DB 28) corresponding to the moving image of the interest, but can then determine that this moving image is a moving image 400 because images recognized later are E, G.

In addition, the configuration for recognizing a moving image is not limited to the system such as videophone capable of sequentially transmitting images, and, for example, a moving image may be photographed with the camera-attached portable terminal 23 and transmitted from an application to a server 27. The application may be so-called electronic mail. In this case, the user sends mail to which the moving image is attached to a particular mail address in order to transmit data necessary for matching. Then, the result of the processing in the matching is distributed to the user by e-mail. It should be understood that the method of dividing and registering an image described in the above sixth embodiment can also be applied to the case of moving images.

Eighth Embodiment

Meanwhile, in image recognition using characteristic points, for example, matching processing, a larger number of characteristic points to be extracted from an image allows easier recognition of the image. However, a larger number of characteristic points requires more time for matching processing. Therefore, extracting solely the characteristic points effective for the matching processing and registering solely these characteristic points enables effective matching processing.

In general, characteristic points can be extracted by subjecting an input image desired to be registered to various kinds of image processing. This image processing includes, for example, processing for blurring an image, and processing for changing the size of an image. Characteristic points extracted in this manner are obviously locally different from other pixels in the characteristic amount. However, it is not possible to avoid the existence of a plurality of points having similar characteristic amounts in the same image.

Here, assume a case where there are a plurality of points having similar characteristic amounts in an image Z. In such a case, in the matching of the image Z with an image obtained by photographing the image Z, characteristic points extracted from the image Z are judged to be similar to the plurality of points in the image Z. This makes it difficult to achieve stable matching. Thus, similar characteristic points contained in the same image inhibit stable matching and reduce the processing speed of matching.

Furthermore, it is not possible to easily eliminate such characteristic points contained in the same image and similar to each other except when these characteristic points have exactly the same characteristic amount. This is due to the fact that it is difficult to set, in accordance with the effectiveness of matching, a threshold value for judging the characteristic points to be similar in the same image.

In view of such circumstances, in the present eighth embodiment, a simulation of photography is run for an object image at the time of registration, and the effectiveness of each characteristic point is evaluated in the matching with the object image itself. In this manner, characteristic points to be registered are selected in order to effectively achieve stable matching using the minimum number of characteristic points.

The simulation of photography includes various kinds of processing enabled by a general image processing program, such as rotation, two- and/or three-dimensional affine transformation including enlargement and reduction, processing for adding noise and/or blur during photography, processing for adding noise of image compression in an image size, processing for operating a level to reflect an illumination environment, processing for operating contrast, processing for, for example, operating a gamma curve, processing for operating the deterioration of color information, and processing for color overlay operation.

A TP creation unit 50 for creating templates used in matching processing comprises, for example, a characteristic point extractor, a simulation image group creator, a matching processor and a characteristic point evaluator. Details of the functions of these components are as follows:

The characteristic point extractor extracts characteristic points from an object image desired to be registered.

The simulation image group creator subjects the object image to the simulation, and creates at least one simulation image. The simulation image group creator further extracts characteristic points of the group of simulation images.

The matching processor compares the characteristic points extracted in the characteristic point extractor with the characteristic points extracted in the simulation image group creator. Here, in the comparison of the characteristic points, the characteristic points extracted in the characteristic point extractor may be treated on the assumption that these characteristic points have been registered in a TP data management DB 28, and matched with characteristic points extracted from their simulation images. Moreover, the characteristic points extracted in the simulation image group creator may be treated on the assumption that these characteristic points have been registered in the TP data management DB 28, and matched with the characteristic points extracted in the characteristic point extractor.

The characteristic point evaluator associates amounts contributed to actual matching with the characteristic points extracted in the characteristic point extractor with reference to the result of matching processing by the matching processor. Then, the contribution amounts are treated as the qualities of the characteristic points, and the characteristic points are ordered. Moreover, only the characteristic points having qualities equal to or more than a given threshold value and/or a certain number of characteristic points in high ranks are selected, and these characteristic points are determined as the characteristic points of the object image desired to be registered.

As described above, selecting the characteristic points of the registration target enables preferential registration of the points effective in actual matching processing. This makes it possible to reduce the processing time of the matching and obtain a highly accurate result.

Ninth Embodiment

In the ninth embodiment, a plurality of characteristic points are extracted from an input image, and a characteristic point group composed of these characteristic points is compared with a pre-registered characteristic point group for each object, thereby identifying the same object.

The characteristic point in the image referred to here indicates a characteristic point which is different from other pixels at a certain level or more, and its characteristic amount includes, for example, contrast between brightness and darkness, color, the distribution of surrounding pixels, the value of a differential component, and the arrangement of the characteristic points. In the present ninth embodiment, the characteristic points are registered for each object after extraction. At the time of actual identification, an input image is searched to extract characteristic points, and the characteristic points are compared with pre-registered data.

Figure 23:
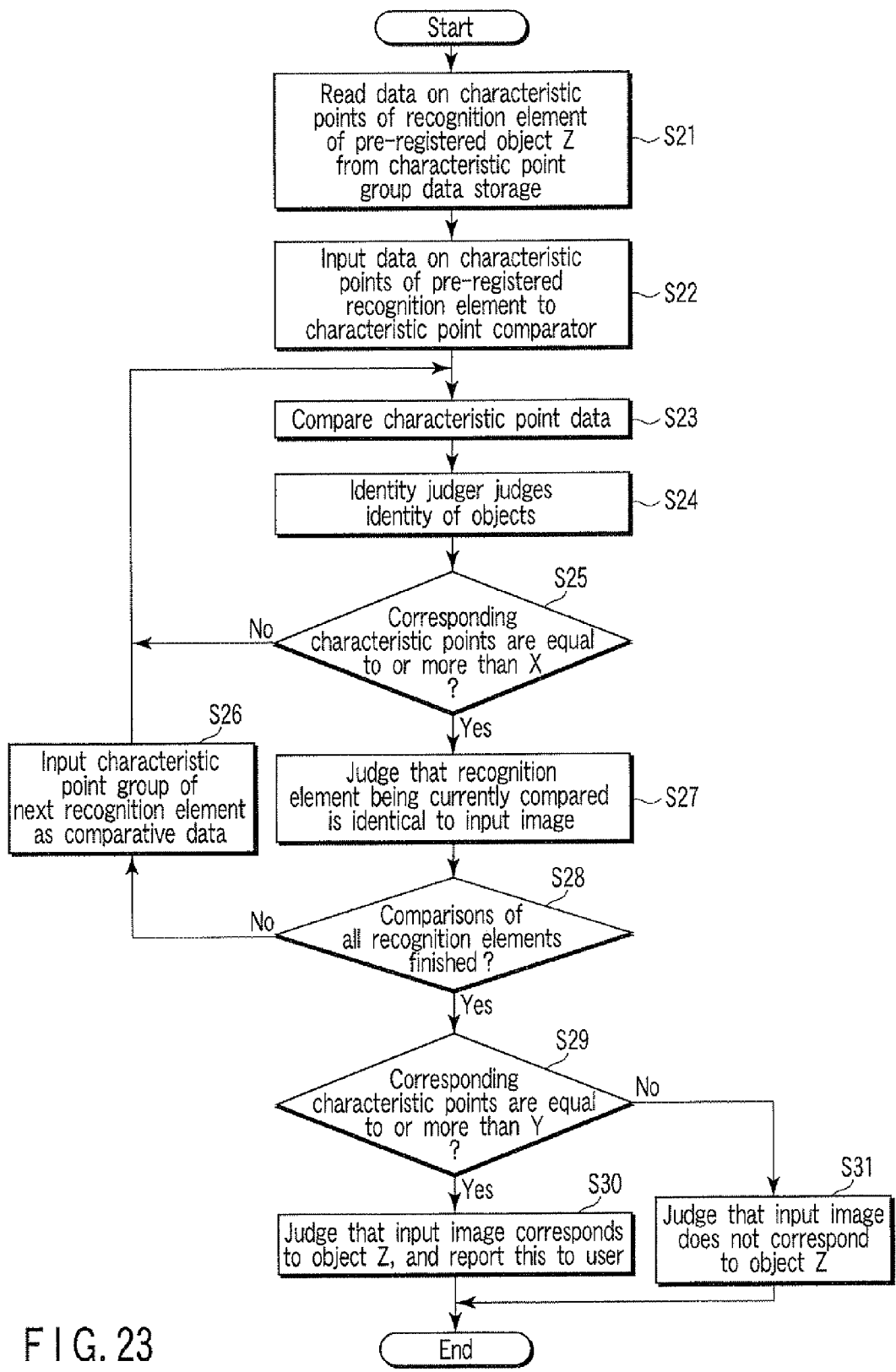
FIG. 23 is a flowchart showing recognition element identifying processing.

The flow of operation control in the identification processing in the matching processor in the present ninth embodiment will be explained below with reference to FIG. 23. First, data on characteristic points of a recognition element of a pre-registered object Z is read from a characteristic point data storage storing characteristic point groups (step S21). Then, the characteristic point data is input to a characteristic point comparator for comparing characteristic point data (step S22). Further, the characteristic point comparator compares the characteristic point data with characteristic point data for the input object (step S23).

Subsequently, an identity judger for judging the identity of objects identifies the object Z with the input object (step S24). Then, whether the number of corresponding characteristic points is equal to or more than a predetermined value (here, X) is judged (step S25). If step S25 branches to NO, a return is made to step S23. On the other hand, if step S25 branches to YES, it is judged whether the recognition element of the object Z being presently compared is the same as the input object (step S27).

Then, it is judged whether the comparisons of all the recognition elements have been finished (step S28). If step S28 branches to NO, characteristic point data for the characteristic point group of the next recognition element is input as comparative data to the characteristic point comparator (step S26), and a return is made to step S23. On the other hand, if step S28 branches to YES, whether the number of corresponding characteristic points is equal to or more than a predetermined value (here, Y) is judged (step S29). Here, if step S29 branches to YES, the object is judged to correspond to the object Z, which fact is displayed on, for example, a display unit and reported to the user (step S30). On the other hand, if step S29 branches to NO, the object is judged not to correspond to the object Z (step S31).

In addition, in the actual identification, when a numerical value indicating the degree of similarity (difference of components between characteristic points) exceeds a preset threshold value, these characteristic points are judged to be similar characteristic points. Then, an object in which a plurality of characteristic points further correspond is judged to be the same as the object of the input image. At this point, the characteristic point group in the input image is compared with the pre-registered characteristic point group as follows:

Firstly, the object is registered after being divided into a plurality of elements. Thus, in the comparison between objects, recognition is carried out with a judgment logic that the object is not regarded as recognized unless a plurality of (e.g., three) elements are recognized.

Secondly, in the recognition of an object, if a similar object is contained in an image, a company S using OBJ1 (characteristic point group; A, B, C) as its logo mark and a company M using OBJ2 (characteristic point group; E, F, G) as its logo mark is assumed. Assume here that the company S is competing with the company M. In such a case, the confusion of their logo marks should be avoided as much as possible. In view of such circumstances, in the present ninth embodiment, both of these objects are not recognized when A and E are simultaneously detected from the same screen. That is, the judgment for recognition is stricter.

Thirdly, a sentence/expression for conveying the result of recognition to the user has heretofore been the same regardless of the number of recognized characteristic points. Therefore, when, for example, only some of the characteristic points can be recognized, that is, when the degree of correspondence between the input image and the comparative image is a degree of correspondence including uncertainty, this fact cannot be communicated to the user. On the other hand, in the present ninth embodiment, the way of displaying the result (way of expression) is changed, and an expression including uncertainty is used when the number of recognition elements is small.

The elaborations described above make it possible to obtain the following advantages.

Firstly, it is possible to reduce the probability of false recognition due to the correspondence of parts of the objects alone.

Secondly, a judgment standard can be stricter when it is particularly desired to avoid the false recognition of objects.

Thirdly, even when the accuracy of the identity judgment of the object is lower than a predetermined value, a judgment result indicating correspondence can be reported to the user while the user is being urged to pay attention.

On the other hand, in the case of OBJ1 (characteristic point group; A, B, C) and OBJ2 (characteristic point group; E, F, G) which are objects having their characteristic points registered in a divided manner, recognition based on the following judgment logic is carried out.

Firstly, the recognition of OBJ1 is not regarded as successful unless "A and B and C".

That is, when OBJ1 composed of A, B, C as recognition elements is to be recognized, the recognition of OBJ1 is not regarded as successful if any one or two of A, B, C is recognized.

Furthermore, as its modification, A, B, C are weighted as evaluation points. For example, A, B, C are weighted by 1, 0.5, 0.3, respectively. Here, if an authentication is given when a total of the valuation points exceeds 1.5, OBJ1 is authenticated because the total of the evaluation points is 1.5 when A and B are found as the recognition elements. On the other hand, OBJ1 is not authenticated when B and C are found.

The evaluation points of these recognition elements can be managed together with the characteristic points of the recognition elements.

Furthermore, the logical expression permits changes in the priority of the elements, and combinations such as A and (B or C) and A or (B and C) are acceptable in addition to A and B and C. In all of these examples, A is an essential element for the recognition to be successful.

In addition, the above-mentioned examples of evaluation points can be used in combination with the above-mentioned examples of logical expressions. That is, the priority of the logical expression can be used in combination with the weighting of the respective elements.

Secondly, both OBJ1 and OBJ2 are not recognized when E and A are extracted.

For example, the company S using OBJ1 as its logo is competing with the company M using OBJ2 as its logo, and if it is desired to avoid the confusion of these logos as much as possible, both of these logos are recognized when the logo OBJ1 of the company S and the logo OBJ2 of the company M are contained in the same screen. In this case, an indication is shown to inform the user that the recognition is unsuccessful not because no object image is detected but because recognition elements are detected from both (A, B, C) and (E, F, G).

Thus, in the present ninth embodiment, in the case of identifying the logos of, for example, companies competing with each other, only one of the logos is recognized, for example, when only one of the logo OBJ1 of the company S and the logo OBJ2 of the company M is in the screen. Specifically, OBJ1 or OBJ2 is recognized only when any one of (A, B, C) or any one of (E, F, G) alone is detected in the same screen. In other words, when any one of (A, B, C) and any one of (E, F, G) are detected in the same screen, neither OBJ1 and OBJ2 are recognized.

Thirdly, the way of presenting a result is changed when only a part, such as A and B, is detected (an expression including uncertainty is maintained).

For example, when all of the recognition elements A, B, C can be recognized with regard to OBJ1, the result of the recognition is presented to the user with a strong expression "OBJ1 has been authenticated". When two recognition elements such as A and B or B and C can be recognized, the result of the recognition is presented to the user with an expression including slightly reduced certainty, such as "Seems to be OBJ1". When one recognition element can be recognized, the result of the recognition is presented to the user with an expression including uncertainty, for example, "OBJ1 may have been recognized".

As a modification of the present ninth embodiment, the above-mentioned elaboration in the way of expression is conceived when the result of recognition based on the total evaluation point is presented to the user in the case of using the above-mentioned weighted evaluation points. Moreover, it goes without saying that the above-mentioned elaboration in the way of expression in presenting the recognition result to the user is applicable in various scenes. For example, it is applicable to the recognition of a desired single recognition element. Moreover, the above-mentioned way of expression in presenting the recognition result to the user is applicable depending on the number of corresponding characteristic points in a recognition element and the degree of correspondence between the extracted characteristic points and the registered characteristic points.

In addition, the TP creation unit 50 may operate on the server 20 when the present ninth embodiment is applied to the sixth embodiment described above. Moreover, the sheet 40 means any display surface, and is not limited to paper. For example, it may be made of other materials, such as a metal or plastic, or may be an image display device such as a liquid crystal monitor or a plasma television. It should be appreciated that information displayed on such means corresponds to a kind of information displayed in an area of light visible to human beings. However, it should be understood that such information may be invisible to human beings as long as it can be input to the image input unit. Moreover, the object includes everything that can be acquired as an image, such as an X-ray image or thermography.

In addition, in FIG. 10, the image capturing the object image input from the image input unit 24 is transmitted from the camera-attached portable terminal to the matching processing unit 29 in the server 20. In this case, the image acquired by the image input unit 24 may be transmitted as image data with no change, but may also be transmitted in a reduced form. Further, characteristic data to be used in matching may be extracted from the image, and the characteristic data may be transmitted. Moreover, both the image and the characteristic data may be transmitted. That is, any form of data may be transmitted as long as it can be derived from the image.

Tenth Embodiment

In the present tenth embodiment, a server, in the sixth to ninth embodiments described above, includes an image storage unit for storing registered images to be compared with an input image.

Characteristic point group data previously extracted at the time of image input is generally used as data for use in comparison. Therefore, information stored in a storage for storing data for use in comparison is also characteristic point group data in general. Then, in the operation of comparison, identity is judged taking, for example, the similarity of data into account. In such a case, if there are, for example, two significantly similar images in the data for use in comparison, it may be difficult in some cases to judge the similarity of the input image. In this case, if there is an image for use in comparison (original data from which a group of characteristic points is extracted; hereinafter referred to as an original image), changing a standard of extracting a characteristic amount enables more accurate comparison and enables the user to visually check the extraction result of the characteristic point group using the original image. Moreover, the image itself may have a smaller capacity than the characteristic point group data extracted from this image.

In view of such circumstances, it is useful to assume an image as the data for use in comparison and provide the server with the image storage unit for this image, as in the present tenth embodiment. In addition, a characteristic point group may be extracted from the image for use in comparison every time the comparison operation of the image takes place.

Eleventh Embodiment

In the present eleventh embodiment, a server, in the sixth to ninth embodiments described above, has a location storage unit for showing, as comparative data for a characteristic point group in an input image, location information which indicates a characteristic point group and a place where an image corresponding to this characteristic point group is recorded.

For example, assume a case where an image or a characteristic point group extracted from the image is recorded, as data for comparison with the characteristic point group in the input image, in an image recording unit for recording images. In such a case, the size of data for use in comparison, which is an image or a characteristic point group extracted from the image, may be large, and retaining the data in the system may not be a good method in some cases. Thus, when the improvement of the overall performance is considered, the image recording unit for recording images should not be provided in the system.

In view of such circumstances, the server is provided with the location storage unit which records the location information for searching for an image judged to be identical as a result of matching processing when this image is necessary. Here, the location information includes, for example, information on a link to the above image located in another system different from the system of interest, information on a link to the above image on the Internet, and search information such as a keyword for extracting the above image on the Internet. Such location information is recorded and managed in the location storage unit as location information indicating the relation with the characteristic point group registered for use in comparison. In the present eleventh embodiment, the above-mentioned location storage unit is provided in the system of interest.

Twelfth Embodiment

The present twelfth embodiment is characterized in that, in the sixth to eleventh embodiments described above, information on a three-dimensional arrangement in a photography object is added to a characteristic point group for comparison with an input image.

That is, in the present twelfth embodiment, the information on the three-dimensional arrangement in the photography object is introduced. Here, the three-dimensional arrangement information means a coordinate value of each characteristic point on a so-called object local coordinate system. An object recognition method according to the present twelfth embodiment will hereinafter be described with reference to FIGS. 24 and 25. Here, points with (1) to (11) in FIGS. 24 and 25 indicate characteristic points. These characteristic points are characteristic points extracted in the input image. Moreover, as shown in FIG. 24, the characteristic points (1) to (5) indicate the characteristic points of a tree shown on the left, and the characteristic points (6) to (11) indicate the characteristic points of a house shown on the right. Here, FIG. 25 only shows the characteristic points extracted from FIG. 24. In addition, these characteristic points have been registered in advance as a group of characteristic points of the photography object in a database for registering characteristic point groups.

Here, regarding the characteristic points of the tree, the characteristic points (2) to (5) are registered using the characteristic point (1) as an original point together with three-dimensional positions which are their three-dimensional arrangement information, that is, (2X, 2Y, 2Z) to (5X, 5Y, 5Z). In addition, a method of detecting such three-dimensional positions of the characteristic points includes a method of detecting in the form of images, or a method of detecting using a measuring instrument.

According to the present twelfth embodiment, if the three-dimensional arrangement information for the characteristic points is registered simultaneously with the registration of the characteristic points, the following advantage can be obtained: A re-inspection can be further conduced using the three-dimensional arrangement information after predetermined recognition has been achieved by the comparison of the characteristic points in, for example, matching. That is, according to the present twelfth embodiment, it is possible to reduce false recognition in matching.

In addition, various techniques are conceivable as methods of the re-inspection using the three-dimensional arrangement information. For example, the positions of the characteristic points when projected on a two-dimensional plane using a predetermined characteristic point as an original point are compared with the positions of the normally acquired and registered characteristic points, and the difference therebetween is found on the basis of the three-dimensional arrangement information, such that the accuracy of recognition in this matching can be found.

According to this method, for example, the characteristic points of the characteristic point group recognized as parts of the tree in the input image are inspected in order, and each point is used as an original point to ascertain whether the positions of the characteristic points (1) to (5) when projected on a two-dimensional plane on the basis of the three-dimensional arrangement information for the other characteristic points correspond to the registered characteristic points (1) to (5). This inspection is conducted for all the characteristic points using the characteristic point (1) as an original point, using the characteristic point (2) as an original point, Then, the result of the inspection showing the maximum correspondence is employed.

The above-mentioned inspection method makes it possible to find a positional relation between the image input device (e.g., a camera) and a photography object. Moreover, if lens parameters (e.g., a view angle, a focal distance) of this image input device are found in advance, the distance between each characteristic point in the photography object and the image input device can be found.

Thirteenth Embodiment

The present thirteenth embodiment not only carries out the recognition of each characteristic point group but also carries out recognition coupled with arrangement information, which is information on the positions of the characteristic point groups, in the case where a plurality of characteristic point groups are extracted in an input image, and the input image is compared with a registered image in matching these images, in the sixth to twelfth embodiments described above.

The characteristic point groups are extracted from within the input image, and compared with comparative characteristic point groups in order to achieve matching. According to the present thirteenth embodiment, it is possible to recognize, in the example shown in FIG. 24, that the tree is located on the left of the house in the screen, in accordance with a positional relation between the characteristic points (1) to (5) belonging to the characteristic point group of the tree and the characteristic points (6) to (11) belonging to the characteristic point group of the house.

According to the present thirteenth embodiment, it is possible to judge the following arrangement state by recognizing the above-mentioned positional relation of the characteristic points. For example, in the example shown in FIG. 24, the image in which the tree is located on the left and the house is located on the right is taken by, for example, a camera positioned opposite the front of the house. Moreover, an image in which the tree and the house are located substantially at the same position in the screen is taken by, for example, a camera positioned in a direction in which the tree and the house are aligned, that is, in a direction slanted with respect to the front of the house.

Furthermore, it is also possible to know which of the tree and the house is located at the front, in accordance with how the arrangement of the characteristic point groups and characteristic points expands. In addition, when these objects are movable, an arrangement state at the present moment can be known.

The above-mentioned relation of the arrangement of the characteristic point groups is registered in advance scene by scene, such that even if similar objects are positioned side by side, it is possible to recognize these objects. Specifically, in the case where, for example, houses of the same design are arranged, a house on the right with a tree on the left can be recognized as the house of A, and a house on the left with a tree on the right can be recognized as the house of B. Moreover, three or more characteristic point groups are contained in the same screen, and information on the three-dimensional positions of the characteristic point groups is recorded in advance, such that the positional relation between the camera and the characteristic point groups can be found in detail by the principle of triangular surveying.

Fourteenth Embodiment

The present fourteenth embodiment is characterized in that a matching processing unit, which is a processing unit for actually performing matching, is clustered in order to provide a matching system compatible with an increased velocity or a large volume of registered images.

A general technique in a conventional matching system is a technique in which matching processing units are arranged in parallel with a common database for registering, for example, images used for matching, or a technique in which a database and a matching processing unit with the same contents are arranged in parallel. Such a technique ensures that acceleration of processing can be expected when a large number of matching requests are received at the same time. However, it cannot accelerate matching processing for a large volume of registered images. Moreover, dividing and storing the large volume of registered images in a plurality of databases arranged in parallel ensures accelerated matching processing for the large volume of registered images. However, when the result of matching the divided characteristic point group is finally evaluated, the image used for the matching is not necessarily an image placed in a high rank as a result of a uniform evaluation of the whole registered image group divided. Therefore, this is less than reliable matching processing.

In the present fourteenth embodiment, the following adjustment is made to image groups registered in a plurality of databases (referred to as TP data information DBs) divided and arranged in parallel so that similar images are not registered disproportionately in one TP data information DB.

The characteristic amount of an image which is a registration target is extracted when the image is registered in the TP data information DB. In addition, the characteristic amount may be a thickness distribution in a given area or a characteristic point.

Then, the image which is a registration target is matched with already registered images in the plurality of TP data information DBs divided and arranged in parallel, thereby evaluating the similarity between the image which is a registration target and the already registered images. In addition, the matching processing unit may also be divided and arranged in parallel in the same manner as the TP data information DBs.

Subsequently, the image which is a registration target is registered in the TP data information DB which has been judged, with reference to the similarity evaluation, to be the lowest in the similarity with the image which is a registration target.

In addition, instead of registering the image which is a registration target in the form of addition to the already registered divided images as described above, the whole group of already registered images including the registration target may be redivided. Moreover, the image which is a registration target may be once registered in the form of addition to the already registered divided images, and then the whole group of images may be periodically redivided. In addition, in the redivision, similar images may be stored in the respective TP data information DBs in the most dispersive manner with reference to the similarity. Moreover, for example, when a characteristic point is expressed by a multidimensional vector, consideration of the dispersion of the characteristic points in a multidimensional vector space is effective in the redivision.

Thus, properly selecting the TP data information DB for registering the object image desired to be registered enables a highly reliable matching.

Figure 26:
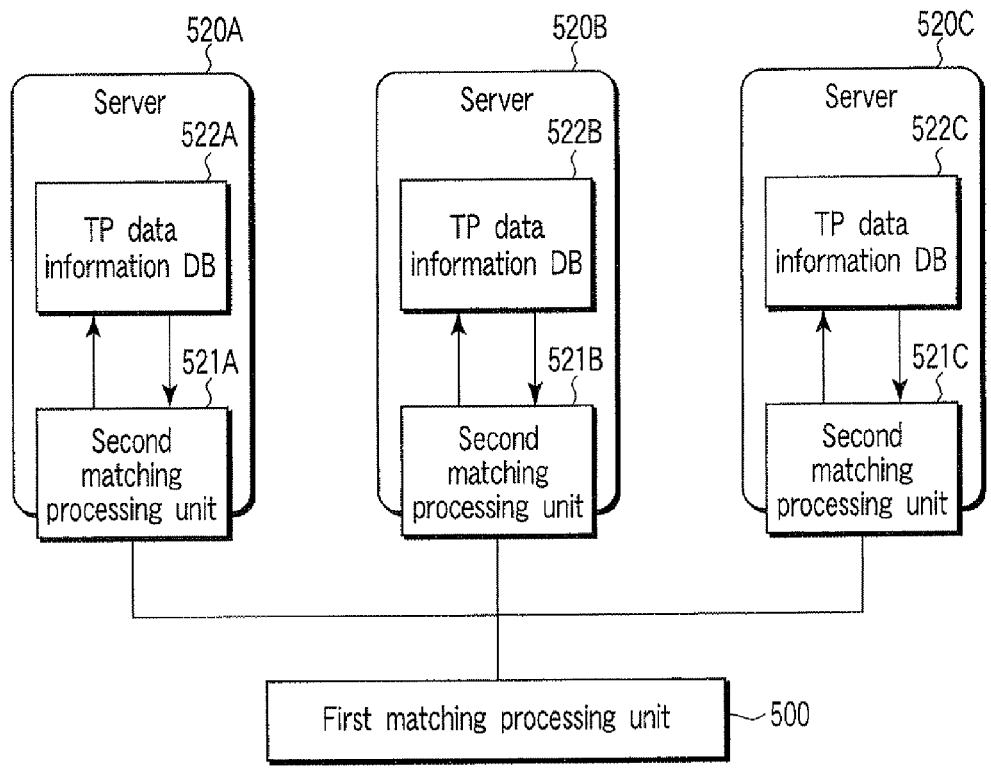
FIG. 26 is a diagram explaining system configurations of a matching processing unit and a TP data management DB in a fourteenth embodiment.

The system configuration of the matching processing unit and the TP data information DB in the present fourteenth embodiment will hereinafter be described with reference to FIG. 26.

In matching, data targeted for matching is first transmitted to a first matching processing unit 500. Then, the first matching processing unit 500 requests second matching processing units 521A to 521C corresponding to the TP data information DBs 520A to 520C arranged in parallel for matching processing in a parallel manner.

Then, the second matching processing units 521A to 521C match corresponding TP data information DBs 522A to 522C with the data targeted for matching.

Then, the second matching processing units 521A to 521C transmit results of the matching processing to the first matching processing unit 500. Here, the matching results include similarity information. Moreover, the matching results may be a matching result of the highest rank alone, matching results of a predetermined number of higher ranks, or matching results with a similarity equal to or more than a given percent. Here, the predetermined number is not limited to a number statically set by the system. For example, it may be a number in which the number of data targeted for matching accepted by the first matching processing unit 500 is divided by the number of TP data information DBs arranged in parallel. In this case, the predetermined number is dynamically changed when the number of TP data information DBs arranged in parallel is changed.

On the other hand, after the second matching processing units 521A to 521C have transmitted the results of the matching processing to the first matching processing unit 500, the first matching processing unit 500 places the matching results received from the second matching processing units 521A to 521C in the order of similarity, and creates a final result. The first matching processing unit 500 may further perform the matching processing on the matching results received from the second matching processing units 521A to 521C. In this case, the use of characteristic amounts more detailed than those in the matching processing performed in the second matching processing units 521R to 521C is effective in improving reliability.

For example, the second matching processing units 521A to 521C use thickness data with a small number of divided areas or thickness data with a few gradations for the matching processing, and the first matching processing unit 500 uses thickness data with a large number of divided areas or thickness data with many gradations for the matching processing. Moreover, the second matching processing units 521A to 521C may use some of the characteristic points retained by the TP data information DBs 522A to 522C, and the first matching processing unit 500 may use all the characteristic points. In this case, as a method of selecting some of the characteristic points, a given number of characteristic points in higher ranks or characteristic points equal to or more than a given degree may be selected in accordance with the reliability and/or effectiveness of the characteristic points, or the characteristic points may be randomly picked up. In addition, the result of the matching by the first matching processing unit 500 may be one characteristic point judged to be most similar, or a plurality of characteristic points equal to or more than a given standard. Here, the given standard may be the number of results or the threshold value of similarity.

It should be understood that, in the configuration in which the TP data information DBs are divided and arranged in parallel, server cases themselves do not necessarily have to be arranged in parallel as the TP data information DBs 522A to 522C.

Performing the above-mentioned matching processing enables the effective use of the TP data information DBs divided and arranged in parallel in the present fourteenth embodiment.

Fifteenth Embodiment

Figure 27:
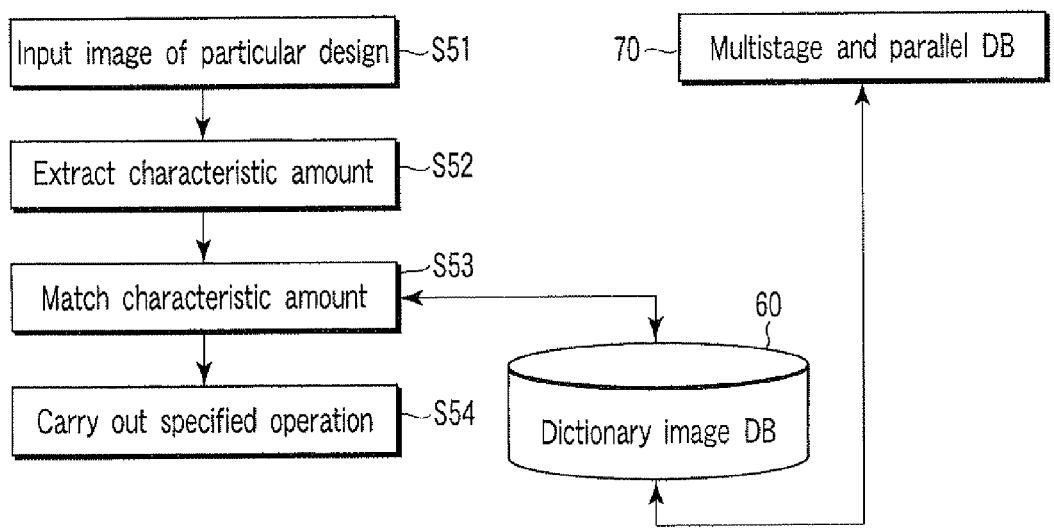
FIG. 27 is a flowchart showing the flow of matching processing using a camera-attached mobile telephone according to a fifteenth embodiment of the present invention.

The following embodiment is also conceivable. In the present fifteenth embodiment, a camera-attached mobile telephone is assumed as an information presentation terminal. Then, part of characteristic amount processing, such as the extraction of a characteristic amount in an image, is performed in this camera-attached mobile telephone. In order to achieve this, application software concerned with the characteristic amount processing of images is preinstalled in the camera-attached mobile telephone. The flow of matching processing of the image using such a camera-attached mobile telephone according the present fifteenth embodiment will hereinafter be described with reference to a flowchart shown in FIG. 27.

First, the user starts the application software in the camera-attached mobile telephone, and uses a camera function to photograph, for example, a predetermined image or design on a sheet (step S51). Then, part of characteristic amount processing (the extraction of a characteristic amount from the image in the present embodiment) is executed by the application in the camera-attached mobile telephone (step S52). Then, the result of the characteristic amount processing in step S52 (the characteristic amount extracted from the image in the present embodiment; the same holds true hereinafter) is sent to the server.

The matching processing unit (not shown) in the server which has received the result of the characteristic amount processing performs the matching processing of the image on the basis of the result of the characteristic amount processing, referring to a dictionary image database 50 in which characteristic amounts of images for comparison (comparative images) are registered (step S53). Then, the result of the matching processing is sent to the camera-attached mobile telephone. Moreover, on the side of the server, a multistage and parallel database 60 which has a multistage and parallel configuration and which comprises a plurality of databases configured in parallel to each other is provided in addition to the dictionary image database 50. Therefore, when the comparative images required for the matching processing are not stored in the dictionary image database 50, the matching processing unit (not shown) searches the multistage and parallel database 60.

Then, the camera-attached mobile telephone which has acquired the result of the matching processing in step S53 executes an operational instruction preset in this result of the matching processing (step S54). Here, if, for example, the operational instruction indicates the display of the URL of a mobile telephone Web site, the matching processing unit (not shown) sends the URL to a Web site access application of the camera-attached mobile telephone, and the camera-attached mobile telephone executes the display of a Web site corresponding to this URL (step S54).

In addition, while the extraction of the characteristic amount in the image is carried out in the camera-attached mobile telephone in the present fifteenth embodiment, the server may carry out the extraction of the characteristic amount in the image depending on the computational capacity of the camera-attached mobile telephone to be used.

Furthermore, in order to clearly indicate to the user that an image as an object to be photographed by the camera-attached mobile telephone is a marker image as shown in, for example, FIGS. 28 and 29, a corner mark (such as a particular symbol mark disposed in the vicinity of a particular design) may be disposed in the vicinity of the image. Here, FIG. 28 shows an example in which one corner mark 72 with an arrow indicating a marker image 70 is disposed in the vicinity of this marker image. FIG. 29 shows an example in which two corner marks 74 are disposed in the vicinity of the marker image 70 so that the marker image 70 is interposed between these corner marks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information presentation system comprising:
an imaging unit which obtains an image;
a peripheral information acquisition unit which acquires peripheral information;
a storage unit which stores registered information;
an analytic basic information construction unit which constructs analytic basic information from the registered information stored in the storage unit, on the basis of the peripheral information acquired in the peripheral information acquisition unit;
a pertinent information acquisition unit which acquires information pertinent to the image from the image obtained from the imaging unit and the analytic basic information obtained from the analytic basic information construction unit; and
a presentation unit which presents the pertinent information acquired in the pertinent information acquisition unit,
wherein the analytic basic information construction unit changes the analytic basic information on the basis of at least one of a time, date, season, weather, temperature, humidity, place, surrounding brightness, average color/color distribution of the acquired image, surrounding sound and model; and
wherein the imaging unit, the pertinent information acquisition unit and the presentation unit are configured in an information presentation terminal,
the peripheral information acquisition unit, the analytic basic information construction unit and the storage unit are configured in a server,
the information presentation terminal is connected to the server via a communication line,
the server further has a second pertinent information acquisition unit with a function equivalent to that of the pertinent information acquisition unit, and
the second pertinent information acquisition unit acquires pertinent information from more analytic basic information than the analytic basic information acquired by the pertinent information acquisition unit, and the presentation unit presents a result of the second pertinent information acquisition unit even when the pertinent information is not acquired in the pertinent information acquisition unit.

2. The information presentation system according to claim 1, wherein the imaging unit, the pertinent information acquisition unit and the presentation unit are configured in an information presentation terminal,
the peripheral information acquisition unit, the storage unit and the analytic basic information construction unit are configured in a server, and
the information presentation terminal is connected to the server via a communication line.

3. The information presentation system according to claim 2, wherein the pertinent information acquisition unit of the information presentation terminal acquires the analytic basic information from a plurality of servers.

4. The information presentation system according to claim 2, wherein the analytic basic information construction unit of the server further acquires information from at least one server other than the former server, and after combining the information, constructs analytic basic information to be transmitted to the information presentation terminal.

5. The information presentation system according to claim 1, wherein the imaging unit, the pertinent information acquisition unit, the peripheral information acquisition unit, the analytic basic information construction unit and the presentation unit are configured in an information presentation terminal, the storage unit is configured in a server, and the information presentation terminal is connected to the server via a communication line.

6. The information presentation system according to claim 1, wherein the imaging unit and the presentation unit are configured in an information presentation terminal, the pertinent information acquisition unit, the peripheral information acquisition unit, the analytic basic information construction unit and the storage unit are configured in a server, and the information presentation terminal is connected to the server via a communication line.

7. The information presentation system according to claim 1, wherein the analytic basic information includes at least one of an image processing filter, a template size, a template gradation, a binarization threshold value and a matching threshold value.

8. The information presentation system according to claim 1, wherein the analytic basic information construction unit sets image processing parameters to be contained in the analytic basic information, on the basis of the similarity of the registered information to serve as the analytic basic information.

9. An information presentation terminal comprising:

an imaging unit which obtains an image;

a peripheral information acquisition unit which acquires peripheral information pertinent to the imaging unit;

an analytic basic information construction unit which constructs analytic basic information from registered information downloaded from a server via a communication line, on the basis of the peripheral information acquired in the peripheral information acquisition unit;

a pertinent information acquisition unit which acquires information pertinent to the image from the image obtained from the imaging unit and the analytic basic information obtained from the analytic basic information construction unit; and a presentation unit which presents the pertinent information acquired in the pertinent information acquisition unit, wherein the analytic basic information construction unit changes the analytic basic information on the basis of at least one of a time, date, season, weather, temperature, humidity, place, surrounding brightness, average color/color distribution of the acquired image, surrounding sound and model; and wherein the imaging unit, the pertinent information acquisition unit and the presentation unit are configured in an information presentation terminal, the peripheral information acquisition unit, the analytic basic information construction unit and the storage unit are configured in a server, the information presentation terminal is connected to the server via a communication line, the server further has a second pertinent information acquisition unit with a function equivalent to that of the pertinent information acquisition unit, and the second pertinent information acquisition unit acquires pertinent information from more analytic basic information than the analytic basic information acquired by the pertinent information acquisition unit, and the presentation unit presents a result of the second pertinent information acquisition unit even when the pertinent information is not acquired in the pertinent information acquisition unit.

10. An object recognizing method comprising the steps of:

previously recording characteristic points of a plurality of objects in a database;

extracting characteristic points from an input image desired to be registered;

comparing the extracted characteristic points with the characteristic points of the plurality of objects previously recorded in the database;

identifying the characteristic points in the input image with the characteristic points of the object recorded in the database with reference to the result of the comparison in the comparing step in order to recognize the object; and displaying the result of the identification in the recognizing step to a user, wherein the object is divided into a plurality of element objects and characteristic points in each of the element objects are registered in the database in the step of previously recording the characteristic points of the plurality of objects in the database, and the object is not identified when a predetermined element object is not recognized in the recognizing step; wherein when a characteristic point group composed of a plurality of characteristic points is extracted in the step of extracting the characteristic points, the comparing step not only carries out the recognition of each of the characteristic point groups but also carries out the comparison considering information on characteristic point arrangement which is a positional relation between the characteristic point groups.

11. The object recognizing method according to claim 10, wherein the object is not identified when a combination of a plurality of recognized element objects is a predetermined combination in the recognizing step.

12. The object recognizing method according to claim 10, wherein when a predetermined combination is not satisfied but at least one of the element objects is recognized in the recognizing step, the result of the identification is displayed to the user with an expression including uncertainty elements in the displaying step.

13. The object recognizing method according to claim 10, wherein an image itself of the object is also recorded in the database in the step of previously recording the characteristic points of the plurality of objects in the database.

14. The object recognizing method according to claim 10, wherein location information indicating a place where an image corresponding to the characteristic points is recorded is recorded in the database together with the characteristic points in the step of previously recording the characteristic points of the plurality of objects in the database.

15. The object recognizing method according to claim 10, wherein the characteristic points are extracted from a two-dimensional image of the object in the step of extracting the characteristic points.

16. The object recognizing method according to claim 10, wherein the characteristic points are calculated on the basis of three-dimensional arrangement information indicating a three-dimensional positional relation of the objects in the step of extracting the characteristic points.

* * * * *